US012508267B2

(12) United States Patent
Bordbar et al.

(10) Patent No.: US 12,508,267 B2
(45) Date of Patent: Dec. 30, 2025

(54) ISOTOPICALLY-LABELLED TRAPIDIL DERIVATIVES

(71) Applicant: Sinopia Biosciences, Inc., San Diego, CA (US)

(72) Inventors: Aarash Bordbar, San Diego, CA (US); Warren S. Wade, San Diego, CA (US); Hiroko Masamune, San Diego, CA (US)

(73) Assignee: SINOPIA BIOSCIENCES, INC., San Diego, CA (US)

( * ) Notice: Subject to any disclaimer, the term of this patent is extended or adjusted under 35 U.S.C. 154(b) by 676 days.

(21) Appl. No.: 17/934,680

(22) Filed: Sep. 23, 2022

(65) Prior Publication Data

US 2023/0102580 A1   Mar. 30, 2023

Related U.S. Application Data

(63) Continuation of application No. PCT/US2021/024226, filed on Mar. 25, 2021.

(60) Provisional application No. 63/063,846, filed on Aug. 10, 2020, provisional application No. 63/000,347, filed on Mar. 26, 2020.

(51) Int. Cl.
*A61P 25/16* (2006.01)
*A61K 31/198* (2006.01)
*A61K 31/519* (2006.01)
*C07B 59/00* (2006.01)
*C07D 487/04* (2006.01)
*A61K 45/06* (2006.01)

(52) U.S. Cl.
CPC .......... *A61K 31/519* (2013.01); *A61K 31/198* (2013.01); *A61P 25/16* (2018.01); *C07D 487/04* (2013.01); *C07B 2200/05* (2013.01)

(58) Field of Classification Search
CPC ... A61P 25/16; C07D 487/04; C07B 2200/05; C07B 59/002
See application file for complete search history.

(56) References Cited

U.S. PATENT DOCUMENTS

| | | | |
|---|---|---|---|
| 4,327,725 A | 5/1982 | Cortese et al. |
| 4,624,848 A | 11/1986 | Lee |
| 4,739,044 A | 4/1988 | Stabinsky |
| 4,757,141 A | 7/1988 | Fung et al. |
| 4,843,155 A | 6/1989 | Chomczynski |
| 4,968,509 A | 11/1990 | Radebaugh et al. |
| 5,348,853 A | 9/1994 | Wang et al. |
| 5,384,261 A | 1/1995 | Winkler et al. |
| 5,445,934 A | 8/1995 | Fodor et al. |
| 5,456,923 A | 10/1995 | Nakamichi et al. |
| 5,461,140 A | 10/1995 | Heller et al. |
| 5,516,527 A | 5/1996 | Curatolo |
| 5,567,583 A | 10/1996 | Wang et al. |
| 5,622,721 A | 4/1997 | Dansereau et al. |
| 5,677,195 A | 10/1997 | Winkler et al. |
| 5,686,105 A | 11/1997 | Kelm et al. |
| 5,700,410 A | 12/1997 | Nakamichi et al. |
| 5,708,153 A | 1/1998 | Dower et al. |
| 5,738,874 A | 4/1998 | Conte et al. |
| 5,744,305 A | 4/1998 | Fodor et al. |
| 5,770,358 A | 6/1998 | Dower et al. |
| 5,770,722 A | 6/1998 | Lockhart et al. |
| 5,789,162 A | 8/1998 | Dower et al. |
| 5,800,992 A | 9/1998 | Fodor et al. |
| 5,854,033 A | 12/1998 | Lizardi |
| 5,858,401 A | 1/1999 | Bhalani et al. |
| 5,869,717 A | 2/1999 | Frame et al. |
| 5,874,219 A | 2/1999 | Rava et al. |
| 5,977,175 A | 11/1999 | Lin |
| 5,994,056 A | 11/1999 | Higuchi |
| 6,015,578 A | 1/2000 | Walch |
| 6,020,135 A | 2/2000 | Levine et al. |
| 6,033,854 A | 3/2000 | Kurnit et al. |
| 6,033,860 A | 3/2000 | Lockhart et al. |
| 6,040,138 A | 3/2000 | Lockhart et al. |
| 6,040,193 A | 3/2000 | Winkler et al. |
| 6,171,785 B1 | 1/2001 | Higuchi |
| 6,344,316 B1 | 2/2002 | Lockhart et al. |
| 6,369,065 B1 | 4/2002 | Chatelain et al. |
| 6,465,014 B1 | 10/2002 | Moroni et al. |

(Continued)

FOREIGN PATENT DOCUMENTS

| | | |
|---|---|---|
| CN | 101720327 A | 6/2010 |
| EP | 0301423 A1 | 2/1989 |

(Continued)

OTHER PUBLICATIONS

Dorwald F. A. Side Reactions in Organic Synthesis, 2005, Wiley: VCH, Weinheim p. IX of Preface. (Year: 2005).*
Agrawal, et al. Site-specific functionalization of oligodeoxynucleotides for non-radioactive labelling. Tetrahedron Letters. 1990 31:1543-1546.
Allen et al., The structure of certain polyazaindenes. III. 1,2,3a,7- and 1,3,3a,7-tetrazaindenes. The Journal of Organic Chemistry 24(6):793-796 (1959).

(Continued)

*Primary Examiner* — Bruck Kifle
*Assistant Examiner* — Kevin S Martin
(74) *Attorney, Agent, or Firm* — WILSON SONSINI GOODRICH & ROSATI

(57) ABSTRACT

Provided are isotopically-labelled Trapidil derivatives useful for the treatment of Parkinson's disease and movement disorders associated with Parkinson's disease. The isotopically-labelled Trapidil derivatives include deuterated Trapidil derivatives. Additionally provided are combination therapies of isotopically-labelled Trapidil derivatives and additional therapeutic agents for the treatment of Parkinson's disease and movement disorders associated with Parkinson's disease.

10 Claims, 4 Drawing Sheets

(56) References Cited

U.S. PATENT DOCUMENTS

| | | | |
|---|---|---|---|
| 6,667,048 B1 | 12/2003 | Lambert et al. | |
| 6,932,983 B1 | 8/2005 | Straub et al. | |
| 6,960,563 B2 | 11/2005 | Egbaria et al. | |
| 10,350,212 B2 * | 7/2019 | Bordbar | A61K 9/0053 |
| 10,350,312 B2 | 7/2019 | Zabow et al. | |
| 11,281,170 B2 | 3/2022 | Jones et al. | |
| 11,628,170 B2 * | 4/2023 | Bordbar | A61K 9/0019 |
| | | | 514/567 |
| 12,268,691 B2 * | 4/2025 | Bordbar | A61K 31/198 |
| 2006/0166972 A1 | 7/2006 | Conn et al. | |
| 2007/0117765 A1 | 5/2007 | Sauve et al. | |
| 2008/0242657 A1 | 10/2008 | Marino et al. | |
| 2008/0293713 A1 | 11/2008 | Liu et al. | |
| 2009/0192111 A1 | 7/2009 | Bader et al. | |
| 2012/0208706 A1 | 8/2012 | Downing et al. | |
| 2018/0243307 A1 | 8/2018 | Bordbar | |
| 2019/0328741 A1 | 10/2019 | Bordbar | |
| 2022/0378794 A1 | 12/2022 | Bordbar | |
| 2023/0201205 A1 | 6/2023 | Bordbar | |

FOREIGN PATENT DOCUMENTS

| | | | | |
|---|---|---|---|---|
| KR | 20150015854 A | 2/2015 | | |
| WO | WO-9309781 A1 | 5/1993 | | |
| WO | WO-9526325 A2 * | 10/1995 | | C07B 59/002 |
| WO | WO-2014019979 A1 | 2/2014 | | |
| WO | WO-2017059113 A1 | 4/2017 | | |
| WO | WO-2017176652 A2 * | 10/2017 | | A61K 31/53 |
| WO | WO-2019149660 A1 | 8/2019 | | |
| WO | WO-2021113266 A1 | 6/2021 | | |
| WO | WO-2021195425 A1 | 9/2021 | | |
| WO | WO-2021262786 A1 | 12/2021 | | |

OTHER PUBLICATIONS

Bank et al. Substituent effect on the electrochemical oxidation of arylmethyl anions. 3. Effect of methyl substitution on diarylmethyl anions. J Org Chem 48(20):3458-3464 (1983).

Barany. Genetic disease detection and DNA amplification using cloned thermostable ligase. PNAS USA 88:189-193 (1991).

Bethke et al., Effects of the triazolopyrimidine trapidil on force of contraction, beating frequency and phosphodiesterase I-IV activity in guinea-pig hearts. Arzneimittelforschung 41(5):461-468 (1991).

Cao et al. Striatal overexpression of DeltaFosB reproduces chronic levodopa-induced involuntary movements. J Neurosci 30(21):7335-7343 (2010).

Caruthers. Gene synthesis machines: DNA chemistry and its uses. Science 230(4723):281-285 (1985).

Cenci et al. Ratings of L-DOPA-Induced Dyskinesia in the Unilateral 6-OHDA Lesion Model of Parkinson's Disease in Rats and Mice. Curr Protoc Neurosci Chapter 9:Unit 9.25 (23 pgs) (2007).

Deslauriers et al. Implication of the ERK/MAPK pathway in antipsychotics-induced dopamine D2 receptor upregulation and in the preventive effects of (+/−)-alpha-lipoic acid in SH-SY5Y neuroblastoma cells. J Mol Neurosci 52(3):378-383 (2014).

Fries et al. Parallel NMR Based on Solution Magnetic-Susceptibility Differences. Application to Isotopic Effects on Self-Diffusion. J Chem Eng Data 55(5):2048-2054 (2010).

Giessler et al. Trapidil derivatives as potential antiatherosclerotic drugs. Arzneimittelforschung 37(5):538-41 (1987).

Giorgi et al. Lowered cAMP and cGMP signalling in the brain during levodopa-induced dyskinesias in hemiparkinsonian rats: new aspects in the pathogenetic mechanisms. Eur J Neurosci. 28(5):941-50 (2008).

Giusti et al. Synthesis and characterization of 5'-fluorescent-dye-labeled oligonucleotides. PCR Methods Appl. 2(3):223-227 (1993).

Guatelli et al. Isothermal, in vitro amplification of nucleic acids by a multienzyme reaction modeled after retroviral replication. PNAS USA 87(5):1874-1878 (1990).

Gupta et al. A general method for the synthesis of 3'-sulfhydryl and phosphate group containing oligonucleotides. Nucleic Acids Res. 19(11):3019-3025 (1191).

Heid et al. Real time quantitative PCR. Genome Res. 6(10):986-994 (1996).

Heiman et al. Molecular adaptations of striatal spiny projection neurons during levodopa-induced dyskinesia. PNAS USA 111(12):4578-4583 (2014).

Heinroth et al. Influence of Trapidil derivatives on arachidonic acid- and prostaglandin endoperoxide analogue-induced platelet aggregation and thromboxane A2 formation. Biomedica biochimica acta 43(8-9):S389-392 (Abstract only) (1983).

Heinroth-Hoffmann et al. Influence of Trapidil and Trapidil Derivatives on the Content of Cyclic Nucleotides in Human Intima Cells Cultured from Atherosclerotic Plaques. Drug Development Res 19(3):321-327 (1990).

Kwoh et al. Transcription-based amplification system and detection of amplified human immunodeficiency virus type 1 with a bead-based sandwich hybridization format. PNAS USA 86(4):1173-1177 (1989).

Lamb et al. The Connectivity Map: Using Gene-Expression Signatures to Connect Small Molecules, Genes, and Disease. Science 313:1929-1935 (2006).

Liberman et al. Pharmaceutical Dosage Forms. 2nd Ed. 1:209-214 (1990).

Lizardi et al. Exponential amplification of recombinant-RNA hybridization probes. Nature Biotechnology 6:1197-1202 (1988).

Nakagawa et al. Simultaneous determination of trapidil and its metabolites in serum by high-performance liquid chromatography. Yakugaku Zasshi 104(6):635-639 (1984).

Nelson et al. Bifunctional oligonucleotide probes synthesized using a novel CPG support are able to detect single base pair mutations. Nucleic Acids Res. 17(18):7187-7194 (1989).

Nguyen et al. Differential expression of c-fos and zif268 in rat striatum after haloperidol, clozapine, and amphetamine. PNAS USA 89(10):4270-4274 (1992).

Nogrady. Medicinal Chemistry A Biochemical Approach, Oxford University Press, New York, pp. 388-392 (1985).

Osinski et al. Pharmakologische Ansatze einer Proteinkinase A-Aktivierung zur Hemmung der Mitogenese glatter Gefallmuskelzellen. zur Erlangung des Doktorgrades der Mathematisch-Naturwissenschaftlichen Fakultat der Heinrich-Heine-Universitat Ditsseldorf. Dissertation (2000).

PCT/US2018/025788 International Search Report and Written Opinion dated Apr. 9, 2018.

PCT/US2021/024226 International Invitation to Pay Additional Fees dated May 28, 2021.

PCT/US2021/024226 International Search Report and Written Opinion dated Aug. 5, 2021.

Pfeifer et al. Biotransformation of the Trapidil (rocornal) derivative AR 12463 in the rat. Die Pharmazie 45(8), 609-614 (1990) (English Abstract).

Ploem. Chapter 1: Fluorescence Microscopy. Fluorescent and Luminescent Probes for Biological Activity Mason, T. G. Ed., Academic Press, Landon, pp. 1-11 (1993).

Pubmed compound record for CID 169505, 5-Methyl[1,2,4]triazolo[1,5-a]pyrimidin-7-amine https://pubchem.ncbi.nlm.nih.gov/compound/169505 (2005).

Raubach et al. Double-blind randomized multicenter study on the efficacy of trapidil versus isosorbide dinitrate in stable angina pectoris. Clin Cardiol. 20(5):483-8 (1997).

Riedel et al. Efficacy of trapidil and some trapidil derivatives on drug-induced cardiac arrhythmias in rats and guinea pigs. Arzneimittel-Forschung 37.8: 923-926 (1987) (English Abstract).

Santini et al. L-DOPA activates ERK signaling and phosphorylates histone H3 in the striatonigral medium spiny neurons of hemiparkinsonian mice. J Neurochem 108(3):621-633 (2009).

Saulnier et al. An Efficient Method For The Synthesis of Guanidino Prodrugs. Bioorganic and Medicinal Chemistry Letters 4(16):1985-1990 (1994).

Sharma et al. Phosphodiesterases: Regulators of cyclic nucleotide signals and novel molecular target for movement disorders. Eur J Pharmacol . 714(1-3):486-97 (2013).

Silverman et al. Chapter 8: Prodrugs and drug delivery systems. In: The Organic Chemistry of Drug Design and Drug Action. San Diego: Academic Press, Inc. p. 352-401 (1992).

(56) References Cited

OTHER PUBLICATIONS

Singh et al. Encyclopedia of Pharmaceutical Technology 2nd Ed. pp. 751-753 (2002).
Singh et al. Encyclopedia of Pharmaceutical Technology 2nd Ed., pp. 754-757 (2002).
Smith et al. Fluorescence detection in automated DNA sequence analysis, Nature 321:674-679 (1986).
Smith et al. Striatal mRNA expression patterns underlying peak dose L-DOPA-induced dyskinesia in the 6-OHDA hemiparkinsonian rat. Neuroscience 324:238-251 (2016).
Smith et al. The synthesis of oligonucleotides containing an aliphatic amino group at the 5' terminus: synthesis of fluorescent DNA primers for use in DNA sequence analysis. Nucl. Acid Res. 13:2399-2412 ( 1985).
Stahl et al. Supplementary material—list of pharmaceutically acceptable acids. Handbook of Pharmaceutical Salts (1 pg.) (2002).
Thanvi et al. Levodopa-induced dyskinesia in Parkinson's disease: clinical features, pathogenesis, prevention and treatment. Postgrad Med J. 83(980):384-388 (2007).
Thürmann et al. Pharmacokinetics of the PDGF-antagonist Trapidil in patients with and without renal impairment. Clin Nephrol 47(2):99-105 (Abstract only) (1997).
U.S. Appl. No. 15/962,999 Office Action dated Jul. 16, 2018.
U.S. Appl. No. 15/962,999 Office Action dated Mar. 8, 2019.
U.S. Appl. No. 15/962,999 Office Action dated Nov. 6, 2018.
U.S. Appl. No. 16/503,128 Office Action dated Jun. 1, 2021.
U.S. Appl. No. 16/503,128 Office Action dated Jun. 16, 2022.
U.S. Appl. No. 16/503,128 Office Action dated Mar. 30, 2020.
U.S. Appl. No. 16/503,128 Office Action dated Nov. 5, 2020.
Yershov et al. DNA analysis and diagnostics on oligonucleotide microchips. PNAS USA 93(10):4913-4918 (1996).
CAS Registry No.: 100557-05-9, 2-[[5-(Diethylamino)[1,2,4]triazolo[1,5-a]pyrimidin-7-yl]pentylamino]ethanol. Retrieved Date:Mar. 21, 2024.
Corsini, A, et al., Trapidil derivatives and low density lipoprotein metabolism by human skin fibroblasts and by human hepatoma cell line Hep G2. Pharmacological Research 21(5):521-31 (1989).
Nakagawa, H, et al., Simultaneous determination of trapidil and its metabolites in serum by high-performance liquid chromatography. Yakugaku Zasshi 104(6):635-9 (1984) (English Abstract).
Osinski, Michael, et al., Pharmacological approaches one Protein kinase A activation to inhibition the mitogenesis of vascular smooth muscle cells. Dissertation Düsseldorf 111 pages (2000).
Walsmann, P, et al., Biochemical and pharmacological aspects of the thrombin inhibitor hirudin. Die Pharmazie 36(10):653,653-660 (1981).
Jiang, Wenfeng et al., Application of Deuteration in Drug Research. Qilu Pharmaceutical Affairs 29(11):682-683 (2010) (English Abstract).
Barnum, C.J. et al. Exogenous corticosterone reduces L-DOPA-induced dyskinesia in the hemi-parkinsonian rat: role for interleukin-1beta. Neuroscience 156(1):30-41 (2008).
Bornschein, I. et al. Biotransformation von Trapidil (Roncornal). Pharmazie 33(1):51-63 (1978) (English Abstract).
Harder, Sebastian et al. Pharmacokinetics of trapidil, an antagonist of platelet derived growth factor, in healthy subjects and in patients with liver cirrhosis. British journal of clinical pharmacology 42(4):443-449 (1996).
Harris, et al. Single-molecule DNA sequencing of a viral genome. Science 320(5872): 106-9 (2008).
Ip et al. Analysis of complex metabolic behavior through pathway decomposition. BMC Syst Biol 5:91 (2011).
Krause et al. Advances in Pharmacological Research and Practice: Proceedings of the 4th Congress of the Hungarian Pharmacological Society, Budapest, pp. 139-142 (1985).
Margulies, Marcel et al. Genome Sequencing in Microfabricated High-density Picolitre Reactors. Nature 437(7057):376-380 (2005).
Soni, Gautam V. et al. Progress Toward Ultrafast DNA Sequencing Using Solid-state Nanopores. Clinical Chemistry 53(11):1996-2001 (2007).
U.S. Appl. No. 15/151,082 Office Action dated Dec. 13, 2018.
U.S. Appl. No. 15/151,082 Office Action dated Jun. 14, 2018.
U.S. Appl. No. 18/176,962 Office Action dated Aug. 12, 2024.
Zuckerman et al. Efficient methods for attachment of thiol specific probes to the 3'-ends of synthetic oligodeoxyribonucleotides. Nucelic Acid Res 15(13):5305-5321 (1987) (in spec as Polynucleotides Res., 15: 5305-5321).
Foster, Allan B. Deuterium Isotope Effects In The Metabolism Of Drugs And Xenobiotics: Implications For Drug Design. Advances in Drug Research 14:1-40 (1985).
Bezard, Erwan et al. Study of the Antidyskinetic Effect of Eltoprazine in Animal Models of Levodopa-Induced Dyskinesia. Mov Disord 28(8):1088-96 (2013).
Co-pending U.S. Appl. No. 19/025,296, inventor Bordbar; Aarash, filed Jan. 16, 2025.
Ko, Wai Kin D. et al. Combined fenobam and amantadine treatment promotes robust antidyskinetic effects in the 1-methyl-4-phenyl-1,2,3,6-tetrahydropyridine (MPTP)-lesioned primate model of Parkinson's disease. Mov Disord 29(6):772-779 (2014).

* cited by examiner

ISOTOPICALLY-LABELLED TRAPIDIL DERIVATIVES

CROSS-REFERENCE

This application is a continuation of International Application No. PCT/US2021/024226, filed on Mar. 25, 2021, which claims the benefit of U.S. Provisional Application Ser. No. 63/000,347 filed Mar. 26, 2020 and U.S. Provisional Application Ser. No. 63/063,846 filed Aug. 10, 2020, each of which is hereby incorporated by reference in its entirety.

STATEMENT AS TO FEDERALLY SPONSORED RESEARCH

This invention was made with government support under R44GM121117 awarded by the National Institutes of Health. The government has certain rights in the invention.

SUMMARY

Provided herein, in certain embodiments, is a compound of Formula (I) or a pharmaceutically salt, co-crystal or solvate thereof:

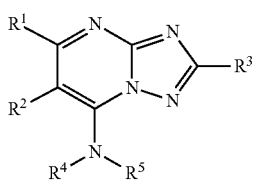

(I)

wherein:
$R^1$ is —CH$_3$, —CD$_3$, —CHD$_2$, or —CH$_2$D;
$R^2$ is hydrogen or -D;
$R^3$ is hydrogen or -D;
$R^4$ is hydrogen, —CH$_2$CH$_3$; —CD$_2$CD$_3$; —CD$_2$CH$_3$; —CH$_2$CD$_3$; —CDHCH$_3$; —CH$_2$CDH$_2$; —CH$_2$CD$_2$H; —CD$_2$CDH$_2$; —CD$_2$CD$_2$H; —CDHCD$_3$; —CDHCDH$_2$; or —CDHCD$_2$H;
$R^5$ is hydrogen, —CH$_2$CH$_3$; —CD$_2$CD$_3$; —CD$_2$CH$_3$; —CH$_2$CD$_3$; —CDHCH$_3$; —CH$_2$CDH$_2$; —CH$_2$CD$_2$H; —CD$_2$CDH$_2$; —CD$_2$CD$_2$H; —CDHCD$_3$; —CDHCDH$_2$; or —CDHCD$_2$H; and
wherein at least one of $R^1$, $R^2$, $R^3$, $R^4$, or $R^5$, comprises at least one deuterium atom.

Provided herein, in certain embodiments, is a compound or a pharmaceutically acceptable salt, co-crystal or solvate thereof, that is:

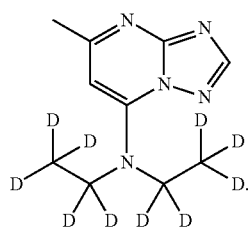

Provided herein, in certain embodiments, is a compound or a pharmaceutically acceptable salt, co-crystal or solvate thereof, that is:

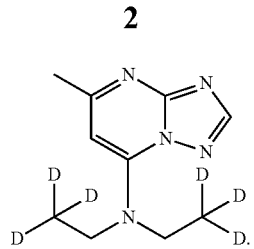

Provided herein, in certain embodiments, is a compound or a pharmaceutically acceptable salt, co-crystal or solvate thereof, that is:

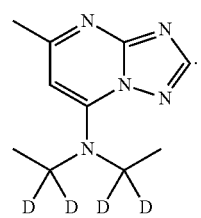 [SMILES: [2H]C([2H])(C)N(c1cc(C)nc2ncnn12)C([2H])([2H])C]

Provided herein, in certain embodiments, is a compound or a pharmaceutically acceptable salt, co-crystal or solvate thereof, that is:

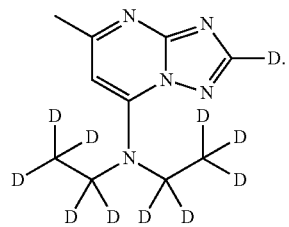

Provided herein, in certain embodiments, is a compound or a pharmaceutically acceptable salt, co-crystal or solvate thereof, that is:

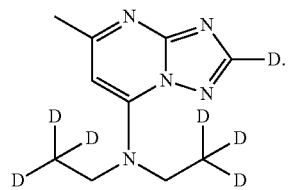

Provided herein, in certain embodiments, is a compound or a pharmaceutically acceptable salt, co-crystal or solvate thereof, that is:

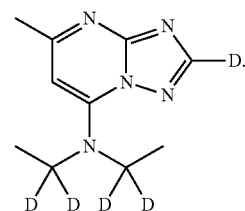

Provided herein, in certain embodiments, is a compound or a pharmaceutically acceptable salt, co-crystal or solvate thereof, that is:

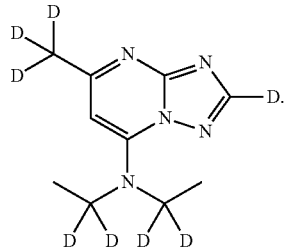

Provided herein, in certain embodiments, is a compound or a pharmaceutically acceptable salt, co-crystal or solvate thereof, that is:

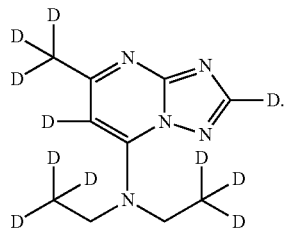

Provided herein, in certain embodiments, is a compound or a pharmaceutically acceptable salt, co-crystal or solvate thereof, that is:

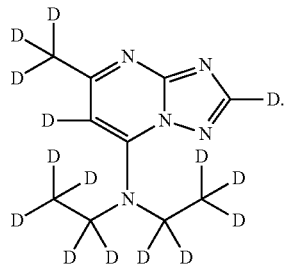

Provided herein, in certain embodiments, is a compound or a pharmaceutically acceptable salt, co-crystal or solvate thereof, that is:

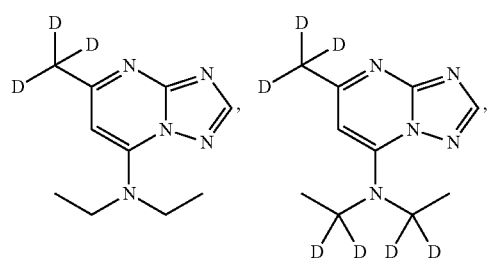

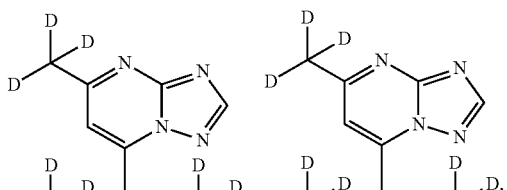

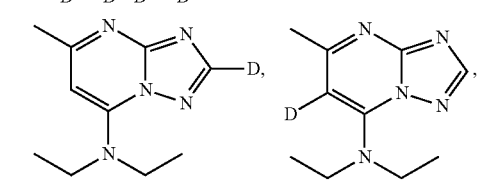

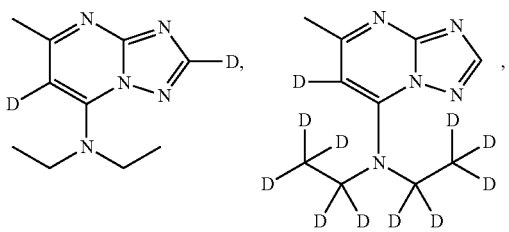

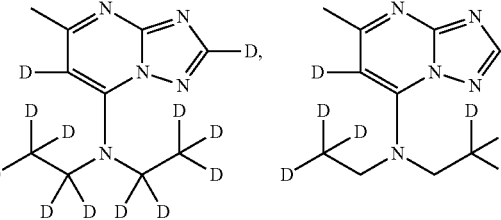

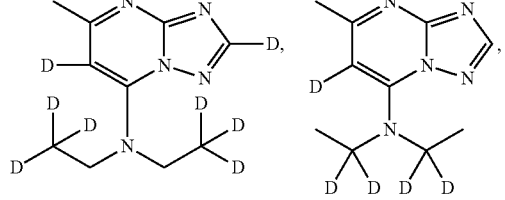

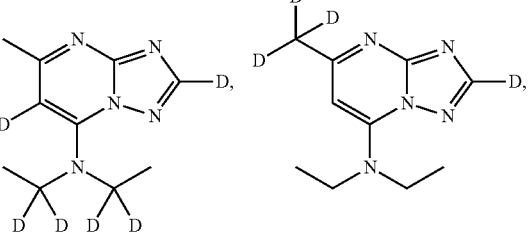

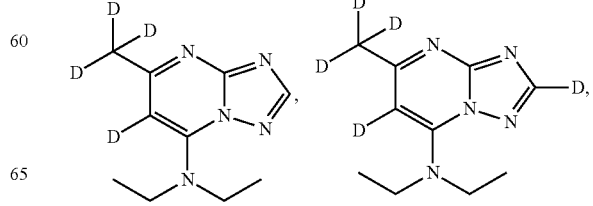

-continued

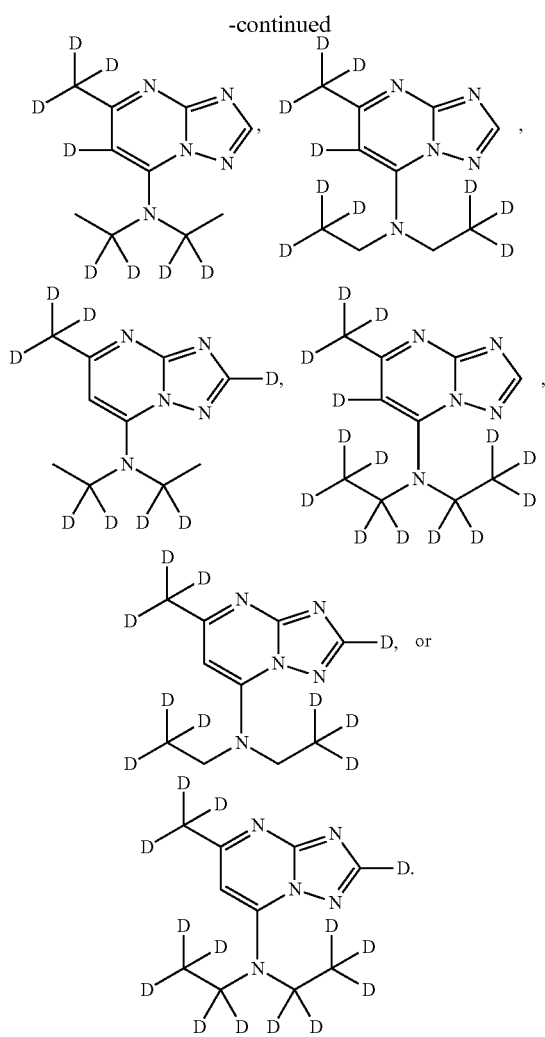

In some embodiments, in any one of the compounds disclosed herein, or in pharmaceutically acceptable salts, co-crystals or solvates thereof, the positions represented as D have deuterium enrichment of at least 98%. In some embodiments, in any one of the compounds disclosed herein, or in pharmaceutically acceptable salts, co-crystals or solvates thereof, the positions represented as D have deuterium enrichment of at least 90%. In some embodiments, in any one of the compounds disclosed herein, or in pharmaceutically acceptable salts, co-crystals or solvates thereof, the positions represented as D have deuterium enrichment of at least 50%. In some embodiments, in any one of the compounds disclosed herein, or in pharmaceutically acceptable salts, co-crystals or solvates thereof, the positions represented as D have deuterium enrichment of at least 10%.

Provided herein, in certain embodiments, is a pharmaceutical composition comprising any one of the compounds disclosed herein, or a pharmaceutically acceptable salt, co-crystal or solvate thereof, and a pharmaceutically acceptable carrier.

Provided herein, in certain embodiments, is a method of treating Parkinson's disease or a movement disorder associated with Parkinson's disease in a subject in need thereof, comprising administering to the subject any one of the compounds disclosed herein or a pharmaceutical composition disclosed herein.

Provided herein, in certain embodiments, is a method of treating Parkinson's disease or a movement disorder associated with Parkinson's disease in a subject in need thereof, comprising administering to the subject a therapeutically effective combination of (a) any one of the compounds disclosed herein or a pharmaceutical composition disclosed herein, and (b) an additional therapeutic agent. In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine, or a combination thereof. In some embodiments, the additional therapeutic agent is a dopamine agonist comprising pramipexole, ropinirole, rotigotine, pergolide, bromocriptine, piribedile, lisuride, or apomorphine, or a combination thereof. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide. In some embodiments, in any of the methods provided herein, the movement disorder to be treated is dyskinesia. In some embodiments, the dyskinesia is levodopa-induced dyskinesia (LID), diphasic dyskinesia, or peak-dose dyskinesia.

In some embodiments, in any of the methods provided herein, the movement disorder to be treated is dystonia. In some embodiments, the dystonia is generalized dystonia, focal dystonia, segmental dystonia, or acute dystonia. In some embodiments, in any of the methods provided herein, the movement disorder to be treated is akathisia. In some embodiments, the akathisia is acute akathisia, chronic akathisia, pseudoakathisia, or withdrawal akathisia. In some embodiments, in any of the methods provided herein, the subject to be treated is diagnosed with Parkinson's disease.

Provided herein, in certain embodiments, is a pharmaceutical combination for use for the treatment or prevention of Parkinson's disease or a movement disorder associated with Parkinson's disease in a subject in need thereof, comprising: a therapeutic combination of (a) any of the compounds disclosed herein or any of the pharmaceutical compositions disclosed herein; and (b) an additional therapeutic agent for treating Parkinson's disease. In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine.

In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor. In some embodiments comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide. In some embodiments, the movement disorder is dyskinesia. In some embodiments, the dyskinesia is levodopa-induced dyskinesia (LID), diphasic dyskinesia, or peak-dose dyskinesia. In some embodiments, the movement disorder is dystonia. In some embodiments, the dystonia is generalized dystonia, focal dystonia, segmental dystonia, or acute dystonia. In some embodiments, the movement disorder is akathisia. In some embodiments, the akathisia is acute akathisia, chronic akathisia, pseudoakathisia, or withdrawal akathisia. In some embodiments, the subject is diagnosed with Parkinson's disease.

DETAILED DESCRIPTION

Figure 1:
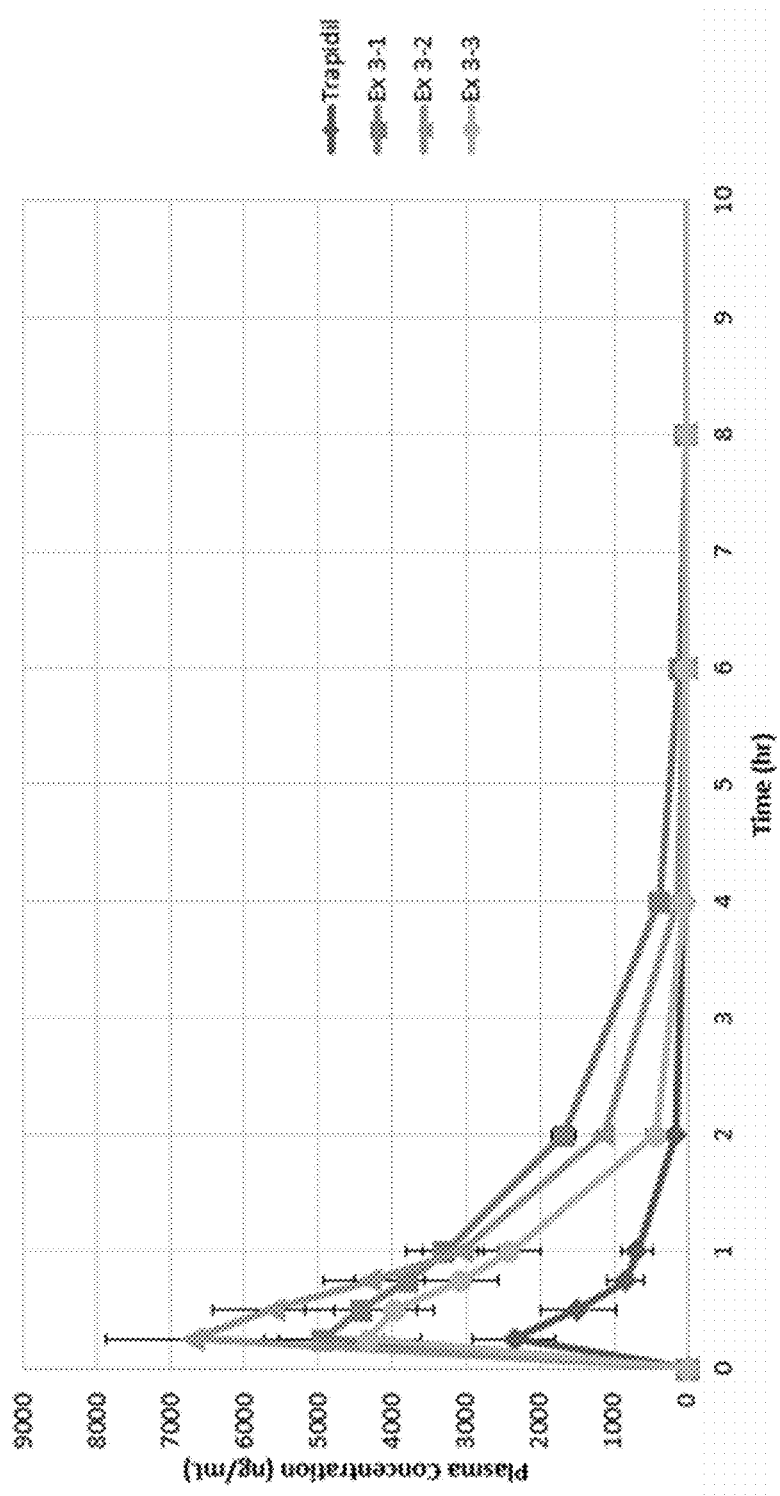
FIG. 1 shows a plasma concentration (ng/mL, linear scale) time profile of male Sprague Dawley rats following oral administration of Trapidil (diamond), Example 3-1 (square), 3-2 (triangle) and 3-3 (circle).

Provided herein, in certain embodiments, are Trapidil derivatives for treating Parkinson's disease and movement disorders associated with Parkinson's disease in a subject in need thereof. In some embodiments, the Trapidil derivative is isotopically-labelled. In some embodiments, the Trapidil-derivative is deuterated. In some embodiments, the movement disorder is an adverse drug reaction to a therapeutic agent used to treat Parkinson's disease. In some embodiments, the Trapidil derivatives of the present disclosure are administered to a subject in need alone, or in combination with an additional therapeutic agent. In some embodiments, the additional therapeutic agent is a dopamine precursor, dopamine agonist, Catechol O-methyl transferase (COMT) inhibitor, monoamine oxidase B (MAOB) inhibitor, or dopa decarboxylase inhibitor.

Parkinson's disease is the second most common neurodegenerative disorder. Parkinson's disease is associated with severe motor, cognitive, and emotional disturbances. Although the mechanism(s) underlying Parkinson's disease neurodegeneration remains unclear, the loss of dopaminergic terminals in the neostriatum and neuronal cell bodies underlie the motor symptoms. Parkinson's disease has pharmacological treatments primarily for motor symptoms and typically increase activation of the two dopamine receptors type: Dopamine 1 receptors (D1, D5) and Dopamine 2 receptors (D2-D4). Dopamine 1 receptors (D1R) are located on striatonigral neurons in the striatum and are activated by dopamine Dopamine 2 receptors (D2R) are located on striatopallidal neurons in the striatum and are inhibited by dopamine Pharmacological activation of D1R in Parkinson's disease models increases expression of several transcripts including FOS, FOSB, JUNB, ARC, and EGR4 which are implicated in the induction of dyskinesia.

Levodopa is the gold standard for treatment of Parkinson's disease and movement disorders associated with Parkinson's disease. Levodopa utilization over time by Parkinson's disease patients leads to motor complications, which include loss of therapeutic efficacy of Levodopa and Levodopa-induced dyskinesia. Further, current adjuvants to levodopa (such as COMT inhibitors, MAOB inhibitors, D2 agonists) exacerbate dyskinesia. Thus, there exists a need for therapeutic agents with fewer side effects that do not cause motor complications in Parkinson's disease patients.

Disclosed herein, in certain embodiments, are combination therapies of Trapidil derivatives and an additional therapeutic agent. In some embodiments, the additional therapeutic agent is levodopa and/or carbidopa. The Trapidil derivatives of the present disclosure are, in some embodiments, isotopically-labelled Trapidil derivatives. In some embodiments, the isotopically-labelled Trapidil derivative is a deuterated Trapidil compound.

Further disclosed herein, are methods of treating Parkinson's disease and movement disorders associated with Parkinson's disease in a subject in need thereof by administering to the subject a Trapidil derivative disclosed herein. In some embodiments, the method comprises further administering an additional therapeutic agent to the subject. In some embodiments, the additional therapeutic agent is levodopa and/or carbidopa. In some embodiments, the levodopa and/or carbidopa is administered to the subject before, after, or simultaneous with the isotopically-labelled Trapidil derivative.

Deuterium Kinetic Isotope Effect

In an attempt to eliminate foreign substances, such as therapeutic agents, from its circulation system, the animal body expresses various enzymes, such as the cytochrome $P_{450}$ enzymes or CYPs, esterases, proteases, reductases, dehydrogenases, and monoamine oxidases, to react with and convert these foreign substances to more polar intermediates or metabolites for renal excretion. Some of the most common metabolic reactions of pharmaceutical compounds involve the oxidation of a carbon-hydrogen (C—H) bond to either a carbon-oxygen (C—O) or carbon-carbon (C—C) π-bond. The resultant metabolites may be stable or unstable under physiological conditions, and can have substantially different pharmacokinetic, pharmacodynamic, and acute and long-term toxicity profiles relative to the parent compounds. For most drugs, such oxidations are generally rapid and ultimately lead to administration of multiple or high daily doses.

The relationship between the activation energy and the rate of reaction may be quantified by the Arrhenius equation, $k = Ae^{-E_{act}/RT}$, where $E_{act}$ is the activation energy, T is temperature, R is the molar gas constant, k is the rate constant for the reaction, and A (the frequency factor) is a constant specific to each reaction that depends on the probability that the molecules will collide with the correct orientation. The Arrhenius equation states that the fraction of molecules that have enough energy to overcome an energy barrier, that is, those with energy at least equal to the activation energy, depends exponentially on the ratio of the activation energy to thermal energy (RT), the average amount of thermal energy that molecules possess at a certain temperature.

The transition state in a reaction is a short lived state (on the order of $10^{-14}$ sec) along the reaction pathway during which the original bonds have stretched to their limit. By definition, the activation energy $E_{act}$ for a reaction is the energy required to reach the transition state of that reaction. Reactions that involve multiple steps will necessarily have a number of transition states, and in these instances, the activation energy for the reaction is equal to the energy difference between the reactants and the most unstable transition state. Once the transition state is reached, the molecules can either revert, thus reforming the original reactants, or new bonds form giving rise to the products. This dichotomy is possible because both pathways, forward and reverse, result in the release of energy. A catalyst facilitates a reaction process by lowering the activation energy leading to a transition state. Enzymes are examples of biological catalysts that reduce the energy necessary to achieve a particular transition state.

A carbon-hydrogen bond is by nature a covalent chemical bond. Such a bond forms when two atoms of similar electronegativity share some of their valence electrons, thereby creating a force that holds the atoms together. This force or bond strength can be quantified and is expressed in units of energy, and as such, covalent bonds between various atoms can be classified according to how much energy must be applied to the bond in order to break the bond or separate the two atoms.

The bond strength is directly proportional to the absolute value of the ground-state vibrational energy of the bond. This vibrational energy, which is also known as the zero-point vibrational energy, depends on the mass of the atoms that form the bond. The absolute value of the zero-point vibrational energy increases as the mass of one or both of the atoms making the bond increases. Since deuterium (D) has twice the mass of hydrogen (H), it follows that a C-D bond is stronger than the corresponding C—H bond. Compounds with C-D bonds are frequently indefinitely stable in $H_2O$, and have been widely used for isotopic studies. If a C—H bond is broken during a rate-determining step in a chemical reaction (i.e. the step with the highest transition state energy), then substituting a deuterium for that hydrogen will cause a decrease in the reaction rate and the process will slow down. This phenomenon is known as the Deuterium Kinetic Isotope Effect (DKIE) and can range from about 1 (no isotope effect) to very large numbers, such as 50 or more, meaning that the reaction can be fifty, or more, times slower when deuterium is substituted for hydrogen. High DKIE values may be due in part to a phenomenon known as tunneling, which is a consequence of the uncertainty principle. Tunneling is ascribed to the small size of a hydrogen atom, and occurs because transition states involving a proton can sometimes form in the absence of the required activation energy. A deuterium is larger and statistically has a much lower probability of undergoing this phenomenon. Substitution of tritium for hydrogen results in yet a stronger bond than deuterium and gives numerically larger isotope effects.

Discovered in 1932 by Urey, deuterium (D) is a stable and non-radioactive isotope of hydrogen. It was the first isotope to be separated from its element in pure form and has twice the mass of hydrogen, and makes up about 0.02% of the total mass of hydrogen (in this usage meaning all hydrogen isotopes) on earth. When two deuterium atoms bond with one oxygen, deuterium oxide ($D_2O$ or "heavy water") is formed. $D_2O$ looks and tastes like $H_2O$, but has different physical properties. It boils at 101.41° C. and freezes at 3.79° C. Its heat capacity, heat of fusion, heat of vaporization, and entropy are all higher than $H_2O$. It is more viscous and has different solubilizing properties than $H_2O$.

When pure $D_2O$ is given to rodents, it is readily absorbed and reaches an equilibrium level that is usually about eighty percent of the concentration that is consumed by the animals. The quantity of deuterium required to induce toxicity is extremely high. When 0% to as much as 15% of the body water has been replaced by $D_2O$, animals are healthy but are unable to gain weight as fast as the control (untreated) group. When about 15% to about 20% of the body water has been replaced with $D_2O$, the animals become excitable. When about 20% to about 25% of the body water has been replaced with $D_2O$, the animals are so excitable that they go into frequent convulsions when stimulated. Skin lesions, ulcers on the paws and muzzles, and necrosis of the tails appear. The animals also become very aggressive; males becoming almost unmanageable. When about 30%, of the body water has been replaced with $D_2O$, the animals refuse to eat and become comatose. Their body weight drops sharply and their metabolic rates drop far below normal, with death occurring at about 30 to about 35% replacement with $D_2O$. The effects are reversible unless more than thirty percent of the previous body weight has been lost due to $D_2O$. Studies have also shown that the use of $D_2O$ can delay the growth of cancer cells and enhance the cytotoxicity of certain antineoplastic agents.

Tritium (T) is a radioactive isotope of hydrogen, used in research, fusion reactors, neutron generators and radiopharmaceuticals. Mixing tritium with a phosphor provides a continuous light source, a technique that is commonly used in wristwatches, compasses, rifle sights and exit signs. It was discovered by Rutherford, Oliphant and Harteck in 1934, and is produced naturally in the upper atmosphere when cosmic rays react with $H_2$ molecules. Tritium is a hydrogen atom that has 2 neutrons in the nucleus and has an atomic weight close to 3. It occurs naturally in the environment in very low concentrations, most commonly found as $T_2O$, a colorless and odorless liquid. Tritium decays slowly (half-life=12.3 years) and emits a low energy beta particle that cannot penetrate the outer layer of human skin. Internal exposure is the main hazard associated with this isotope, yet it must be ingested in large amounts to pose a significant health risk.

Deuteration of pharmaceuticals to improve pharmacokinetics (PK), pharmacodynamics (PD), and toxicity profiles, has been demonstrated previously with some classes of drugs. For example, DKIE was used to decrease the hepatotoxicity of halothane by presumably limiting the production of reactive species such as trifluoroacetyl chloride. However, this method may not be applicable to all drug classes. For example, deuterium incorporation can lead to metabolic switching which may even give rise to an oxidative intermediate with a faster off-rate from an activating Phase I enzyme (e.g., cytochrome $P_{450}$ 3A4). The concept of metabolic switching asserts that xenogens, when sequestered by Phase I enzymes, may bind transiently and re-bind in a variety of conformations prior to the chemical reaction (e.g., oxidation). This hypothesis is supported by the relatively vast size of binding pockets in many Phase I enzymes and the promiscuous nature of many metabolic reactions. Metabolic switching can potentially lead to different proportions of known metabolites as well as altogether new metabolites. This new metabolic profile may impart more or less toxicity. Such methods have not been heretofore sufficiently predictable a priori for any drug class.

Isotopically-Labelled Trapidil Derivatives

The carbon-hydrogen bonds of Trapidil contain a naturally occurring distribution of hydrogen isotopes, namely $^1$H or protium (about 99.9844%), $^2$H or deuterium (about 0.0156%), and $^3$H or tritium (in the range between about 0.5 and 67 tritium atoms per $10^{18}$ protium atoms). Increased levels of deuterium incorporation produce a detectable Kinetic Isotope Effect (KIE) that could affect the pharmacokinetic, pharmacologic and/or toxicologic parameters in comparison to compounds having naturally occurring levels of deuterium.

Disclosed herein, in certain embodiments, are Trapidil derivatives of Formula (I), or a pharmaceutically acceptable salt, co-crystal or solvate thereof:

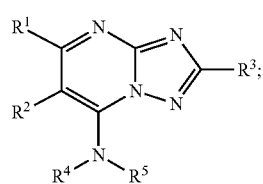

Formula (I)

wherein
$R^1$ is —CH$_3$, —CD$_3$, —CHD$_2$, or —CH$_2$D;
$R^2$ is hydrogen or -D;
$R^3$ is hydrogen or -D;
$R^4$ is hydrogen; —CH$_2$CH$_3$; —CD$_2$CD$_3$; —CD$_2$CH$_3$; —CH$_2$CD$_3$; —CDHCH$_3$; —CH$_2$CDH$_2$; —CH$_2$CD$_2$H; —CD$_2$CDH$_2$; —CD$_2$CD$_2$H; —CDHCD$_3$; —CDHCDH$_2$; or —CDHCD$_2$H;
$R^5$ is hydrogen; —CH$_2$CH$_3$; —CD$_2$CD$_3$; —CD$_2$CH$_3$; —CH$_2$CD$_3$; —CDHCH$_3$; —CH$_2$CDH$_2$; —CH$_2$CD$_2$H; —CD$_2$CDH$_2$; —CD$_2$CD$_2$H; —CDHCD$_3$; —CDHCDH$_2$; —CDHCD$_2$H;
wherein at least one of $R^1$, $R^2$, $R^3$, $R^4$, or $R^5$ comprises at least one deuterium atom.

In some embodiments of a compound of Formula (I), or a pharmaceutically acceptable salt, co-crystal or solvate thereof, $R^1$ is —CH$_3$. In some embodiments of a compound of Formula (I), or a pharmaceutically acceptable salt, co-crystal or solvate thereof, $R^1$ is —CD$_3$. In some embodiments of a compound of Formula (I), or a pharmaceutically acceptable salt, co-crystal or solvate thereof, $R^1$ is —CHD$_2$. In some embodiments of a compound of Formula (I), or a pharmaceutically acceptable salt, co-crystal or solvate thereof, $R^1$ is —CH$_2$D.

In some embodiments of a compound of Formula (I), or a pharmaceutically acceptable salt, co-crystal or solvate thereof, $R^2$ is hydrogen. In some embodiments of a compound of Formula (I), or a pharmaceutically acceptable salt, co-crystal or solvate thereof, $R^2$ is -D.

In some embodiments of a compound of Formula (I), or a pharmaceutically acceptable salt, co-crystal or solvate thereof, $R^3$ is hydrogen. In some embodiments of a compound of Formula (I), or a pharmaceutically acceptable salt, co-crystal or solvate thereof, co-crystal or solvate thereof, $R^3$ is -D.

In some embodiments of a compound of Formula (I), or a pharmaceutically acceptable salt, co-crystal or solvate thereof, $R^4$ is hydrogen. In some embodiments of a compound of Formula (I), or a pharmaceutically acceptable salt, co-crystal or solvate thereof, $R^4$ is —CH$_2$CH$_3$. In some embodiments of a compound of Formula (I), or a pharmaceutically acceptable salt, co-crystal or solvate thereof, $R^4$ is —CD$_2$CD$_3$. In some embodiments of a compound of Formula (I), or a pharmaceutically acceptable salt, co-crystal or solvate thereof, $R^4$ is —CD$_2$CH$_3$. In some embodiments of a compound of Formula (I), or a pharmaceutically acceptable salt, co-crystal or solvate thereof, $R^4$ is —CH$_2$CD$_3$. In some embodiments of a compound of Formula (I), or a pharmaceutically acceptable salt, co-crystal or solvate thereof, $R^4$ is —CDHCH$_3$. In some embodiments of a compound of Formula (I), or a pharmaceutically acceptable salt, co-crystal or solvate thereof, $R^4$ is —CH$_2$CDH$_2$. In some embodiments of a compound of Formula (I), or a pharmaceutically acceptable salt, co-crystal or solvate thereof, $R^4$ is —CH$_2$CD$_2$H. In some embodiments of a compound of Formula (I), or a pharmaceutically acceptable salt, co-crystal or solvate thereof, $R^4$ is —CD$_2$CDH$_2$. In some embodiments of a compound of Formula (I), or a pharmaceutically acceptable salt, co-crystal or solvate thereof, $R^4$ is —CD$_2$CD$_2$H. In some embodiments of a compound of Formula (I), or a pharmaceutically acceptable salt, co-crystal or solvate thereof, $R^4$ is —CDHCD$_3$. In some embodiments of a compound of Formula (I), or a pharmaceutically acceptable salt, co-crystal or solvate thereof, $R^4$ is —CDHCDH$_2$. In some embodiments of a compound of Formula (I), or a pharmaceutically acceptable salt, co-crystal or solvate thereof, $R^4$ is —CDHCD$_2$H.

In some embodiments of a compound of Formula (I), or a pharmaceutically acceptable salt, co-crystal or solvate thereof, $R^5$ is —CH$_2$CH$_3$. In some embodiments of a compound of Formula (I), or a pharmaceutically acceptable salt, co-crystal or solvate thereof, $R^5$ is —CD$_2$CD$_3$. In some embodiments of a compound of Formula (I), or a pharmaceutically acceptable salt, co-crystal or solvate thereof, $R^5$ is —CD$_2$CH$_3$. In some embodiments of a compound of Formula (I), or a pharmaceutically acceptable salt, co-crystal or solvate thereof, $R^5$ is —CH$_2$CD$_3$. In some embodiments of a compound of Formula (I), or a pharmaceutically acceptable salt, co-crystal or solvate thereof, $R^5$ is —CDHCH$_3$. In some embodiments of a compound of Formula (I), or a pharmaceutically acceptable salt, co-crystal or solvate thereof, $R^5$ is —CH$_2$CDH$_2$. In some embodiments of a compound of Formula (I), or a pharmaceutically acceptable salt, co-crystal or solvate thereof, $R^5$ is —CH$_2$CD$_2$H. In some embodiments of a compound of Formula (I), or a pharmaceutically acceptable salt, co-crystal or solvate thereof, $R^5$ is —CD$_2$CDH$_2$. In some embodiments of a compound of Formula (I), or a pharmaceutically acceptable salt, co-crystal or solvate thereof, $R^5$ is —CD$_2$CD$_2$H. In some embodiments of a compound of Formula (I), or a pharmaceutically acceptable salt, co-crystal or solvate thereof, $R^5$ is —CDHCD$_3$. In some embodiments of a compound of Formula (I), or a pharmaceutically acceptable salt, co-crystal or solvate thereof, $R^5$ is —CDHCDH$_2$. In some embodiments of a compound of Formula (I), or a pharmaceutically acceptable salt, co-crystal or solvate thereof, $R^5$ is —CDHCD$_2$H. In some embodiments of a compound of Formula (I), or a pharmaceutically acceptable salt, co-crystal or solvate thereof, any position represented as D has deuterium enrichment of at least 98%.

In some embodiments of a compound of Formula (I), or a pharmaceutically acceptable salt, co-crystal or solvate thereof, any position represented as D has deuterium enrichment of at least 90%. In some embodiments of a compound of Formula (I), or a pharmaceutically acceptable salt, co-crystal or solvate thereof, any position represented as D has deuterium enrichment of at least 80%.

In some embodiments of a compound of Formula (I), or a pharmaceutically acceptable salt, co-crystal or solvate thereof, any position represented as D has deuterium enrichment of at least 70%. In some embodiments of a compound of Formula (I), or a pharmaceutically acceptable salt, co-crystal or solvate thereof, any position represented as D has deuterium enrichment of at least 60%.

In some embodiments of a compound of Formula (I), or a pharmaceutically acceptable salt, co-crystal or solvate thereof, any position represented as D has deuterium enrichment of at least 50%. In some embodiments of a compound of Formula (I), or a pharmaceutically acceptable salt, co-crystal or solvate thereof, any position represented as D has deuterium enrichment of at least 40%.

In some embodiments of a compound of Formula (I), or a pharmaceutically acceptable salt, co-crystal or solvate thereof, any position represented as D has deuterium enrichment of at least 30%. In some embodiments of a compound of Formula (I), or a pharmaceutically acceptable salt, co-crystal or solvate thereof, any position represented as D has deuterium enrichment of at least 20%.

In some embodiments of a compound of Formula (I), or a pharmaceutically acceptable salt, co-crystal or solvate thereof, any position represented as D has deuterium enrichment of at least 10%. In some embodiments of a compound of Formula (I), or a pharmaceutically acceptable salt, co-crystal or solvate thereof, any position represented as D has deuterium enrichment of at least 5%. In some embodiments of a compound of Formula (I), or a pharmaceutically acceptable salt, co-crystal or solvate thereof, any position represented as D has deuterium enrichment of at least 1%.

In some embodiments, the Trapidil derivative disclosed herein is

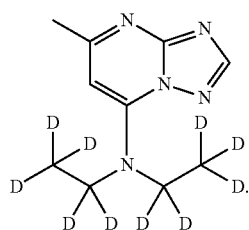

In some embodiments, the Trapidil derivative disclosed herein is

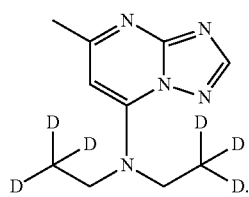

In some embodiments, the Trapidil derivative disclosed herein is

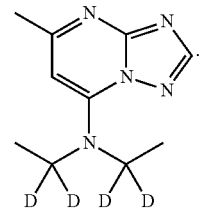 [SMILES: [2H]C([2H])(C)N(c1cc(C)nc2ncnn12)C([2H])([2H])C]

In some embodiments, the Trapidil derivative disclosed herein is

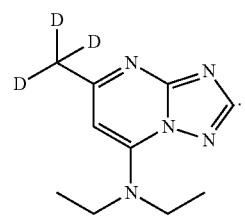 [SMILES: [2H]C([2H])([2H])c1cc(N(CC)CC)n2ncnc2n1]

In some embodiments, the Trapidil derivative disclosed herein is

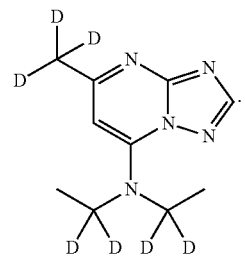 [SMILES: [2H]C([2H])([2H])c1cc(N(C([2H])([2H])C)C([2H])([2H])C)n2ncnc2n1]

In some embodiments, the Trapidil derivative disclosed herein is

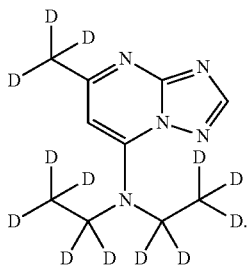

In some embodiments, the Trapidil derivative disclosed herein is

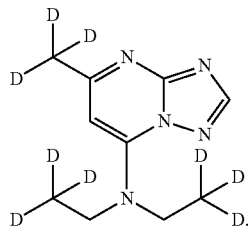

In some embodiments, the Trapidil derivative disclosed herein is

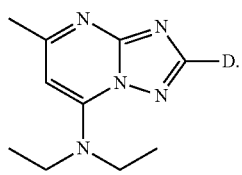

In some embodiments, the Trapidil derivative disclosed herein is

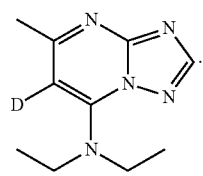

In some embodiments, the Trapidil derivative disclosed herein is

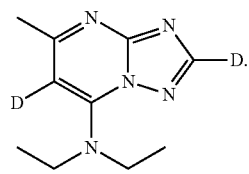

In some embodiments, the Trapidil derivative disclosed herein is

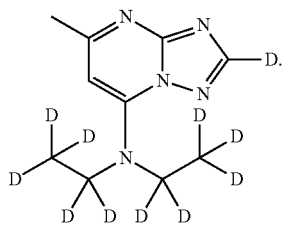

In some embodiments, the Trapidil derivative disclosed herein is

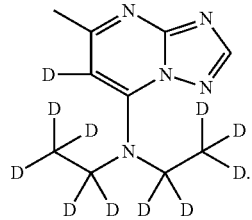

In some embodiments, the Trapidil derivative disclosed herein is

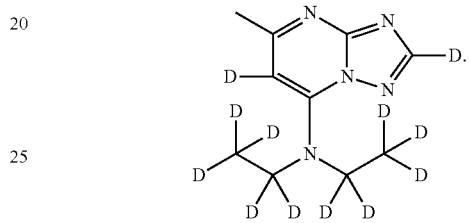

In some embodiments, the Trapidil derivative disclosed herein is

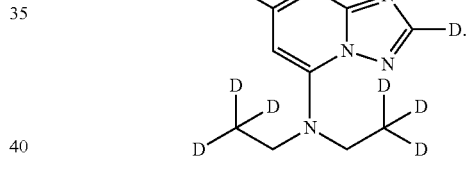

In some embodiments, the Trapidil derivative disclosed herein is

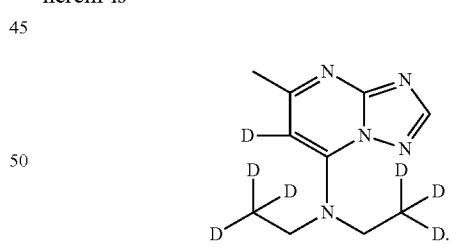

In some embodiments, the Trapidil derivative disclosed herein is

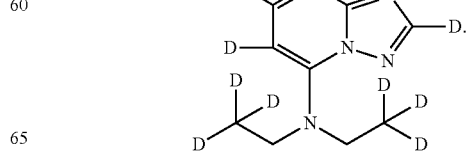

In some embodiments, the Trapidil derivative disclosed herein is

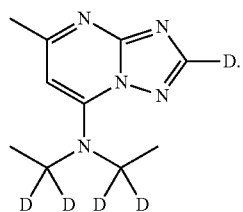

In some embodiments, the Trapidil derivative disclosed herein is

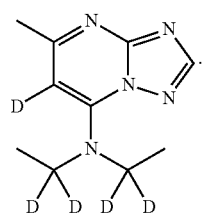

In some embodiments, the Trapidil derivative disclosed herein is

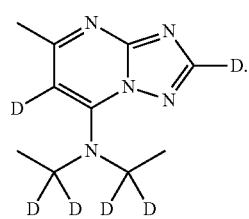

In some embodiments, the Trapidil derivative disclosed herein is

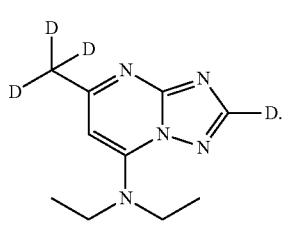

In some embodiments, the Trapidil derivative disclosed herein is

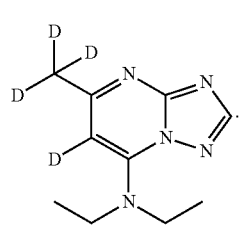 [SMILES: [2H]c1c(C([2H])([2H])[2H])nc2ncnn2c1N(CC)CC]

In some embodiments, the Trapidil derivative disclosed herein is

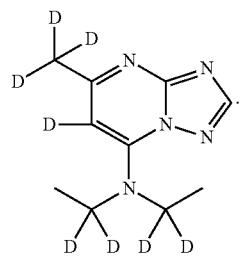

In some embodiments, the Trapidil derivative disclosed herein is

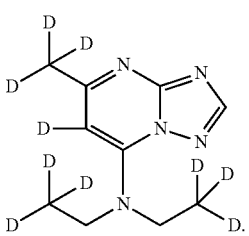

In some embodiments, the Trapidil derivative disclosed herein is

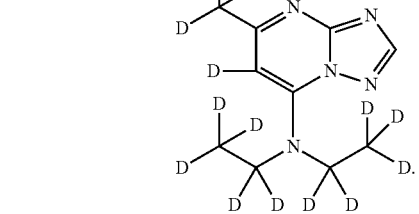

In some embodiments, the Trapidil derivative disclosed herein is

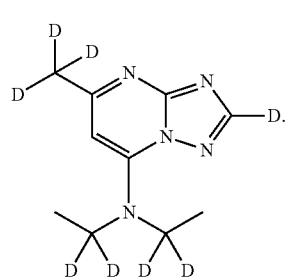

In some embodiments, the Trapidil derivative disclosed herein is

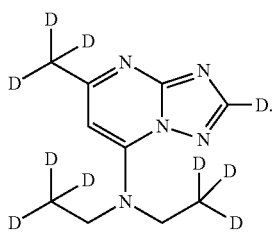

In some embodiments, the Trapidil derivative disclosed herein is

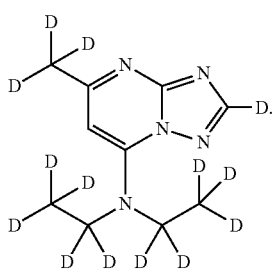

In some embodiments, the Trapidil derivative disclosed herein is

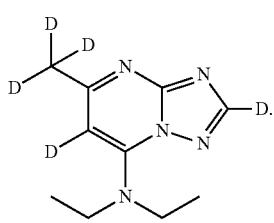

In some embodiments, the Trapidil derivative disclosed herein is

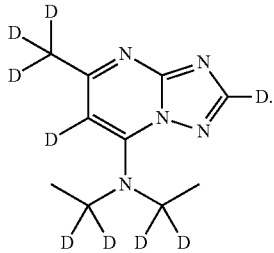

In some embodiments, the Trapidil derivative disclosed herein is

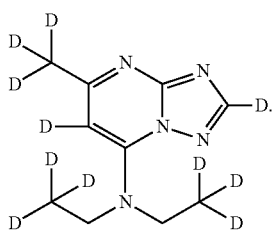

In some embodiments, the Trapidil derivative disclosed herein is

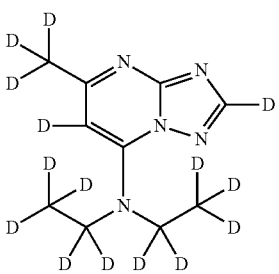 [SMILES: [2H]c1nc2nc(C([2H])([2H])[2H])c([2H])c(N(C([2H])([2H])C([2H])([2H])[2H])C([2H])([2H])C([2H])([2H])[2H])n2n1]

In some embodiments, the deuterated Trapidil derivatives provided herein maintain the beneficial aspects of the corresponding non-isotopically enriched molecules while increasing the half-life ($T_{1/2}$), lowering the maximum plasma concentration ($C_{max}$) of the minimum efficacious dose (MED), lowering the efficacious dose and thus decreasing the non-mechanism-related toxicity, and/or lowering the probability of drug-drug interactions. In some embodiments, the deuterated Trapidil derivatives cause changes in the pharmacological activity of drugs.

Isotopic hydrogen can be introduced into a compound of Formula (I) as provided herein by synthetic techniques that employ deuterated reagents, whereby incorporation rates are pre-determined; and/or by exchange techniques, wherein incorporation rates are determined by equilibrium conditions, and may be highly variable depending on the reaction conditions. Synthetic techniques, where tritium or deuterium is directly and specifically inserted by tritiated or deuterated reagents of known isotopic content, may yield high tritium or deuterium abundance, but can be limited by the chemistry required. In addition, the molecule being labelled may be changed, depending upon the severity of the synthetic reaction employed. Exchange techniques, on the other hand, may yield lower tritium or deuterium incorporation, often with the isotope being distributed over many sites on the molecule, but offer the advantage that they do not require separate synthetic steps and are less likely to disrupt the structure of the molecule being labelled.

The Trapidil derivatives provided herein can be prepared by any suitable methods.

Deuterium can be incorporated to different positions synthetically by using appropriate deuterated intermediates. These deuterated intermediates are either commercially available, or can be prepared by any suitable methods or following procedures similar to those described in the Journal of Organic Chemistry, 48(20), 3458-3464, 1983 or Journal of Chemical and Engineering Data, 55(5), 2048-2054; 2010 and routine modifications thereof.

Pharmaceutically Acceptable Salts

In some embodiments, the Trapidil derivatives described herein exist as their pharmaceutically acceptable salts. In some embodiments, the methods disclosed herein include methods of treating Parkinson's disease and movement disorders associated with Parkinson's disease comprising administering such pharmaceutically acceptable salts. In some embodiments, the methods disclosed herein include methods of treating Parkinson's disease and movement disorders associated with Parkinson's disease comprising administering such pharmaceutically acceptable salts as pharmaceutical compositions. In some embodiments, the movement disorder is dyskinesia. In some embodiments, the dyskinesia is levodopa-induced dyskinesia (LID), diphasic dyskinesia, or peak-dose dyskinesia. In some embodiments, the movement disorder is dystonia. In some embodiments, the dystonia is generalized dystonia, focal dystonia, segmental dystonia, or acute dystonia. In some embodiments, the movement disorder is akathisia. In some embodiments, the akathisia is acute akathisia, chronic akathisia, pseudo-akathisia, or withdrawal akathisia.

In some embodiments, the Trapidil derivatives described herein possess acidic or basic groups and therefore react with any of a number of inorganic or organic bases, and inorganic and organic acids, to form a pharmaceutically acceptable salt. In some embodiments, these salts are prepared in situ during the final isolation and purification of the Trapidil derivatives disclosed herein, or by separately reacting a purified compound in its free form with a suitable acid or base, and isolating the salt thus formed.

Examples of pharmaceutically acceptable salts include those salts prepared by reaction of the Trapidil derivatives described herein with a mineral, organic acid or inorganic base, such salts including, acetate, acrylate, adipate, alginate, aspartate, benzoate, benzenesulfonate, bisulfate, bisulfite, bromide, butyrate, butyn-1,4-dioate, camphorate, camphorsulfonate, caproate, caprylate, chlorobenzoate, chloride, citrate, cyclopentanepropionate, decanoate, digluconate, dihydrogenphosphate, dinitrobenzoate, dodecylsulfate, ethanesulfonate, formate, fumarate, glucoheptanoate, glycerophosphate, glycolate, hemisulfate, heptanoate, hexanoate, hexyne-1,6-dioate, hydroxybenzoate, γ-hydroxybutyrate, hydrochloride, hydrobromide, hydroiodide, 2-hydroxyethanesulfonate, iodide, isobutyrate, lactate, maleate, malonate, methanesulfonate, mandelate metaphosphate, methanesulfonate, methoxybenzoate, methylbenzoate, monohydrogenphosphate, 1-napthalenesulfonate, 2-napthalenesulfonate, nicotinate, nitrate, palmoate, pectinate, persulfate, 3-phenylpropionate, phosphate, picrate, pivalate, propionate, pyrosulfate, pyrophosphate, propiolate, phthalate, phenylacetate, phenylbutyrate, propanesulfonate, salicylate, succinate, sulfate, sulfite, succinate, suberate, sebacate, sulfonate, tartrate, thiocyanate, tosylateundeconate and xylenesulfonate.

Further, the Trapidil derivatives described herein can be prepared as pharmaceutically acceptable salts formed by reacting the free base form of the Trapidil derivative with a pharmaceutically acceptable inorganic or organic acid, including, but not limited to, inorganic acids such as hydrochloric acid, hydrobromic acid, sulfuric acid, nitric acid, phosphoric acid metaphosphoric acid, and the like; and organic acids such as acetic acid, propionic acid, hexanoic acid, cyclopentanepropionic acid, glycolic acid, pyruvic acid, lactic acid, malonic acid, succinic acid, malic acid, maleic acid, fumaric acid, p-toluenesulfonic acid, tartaric acid, trifluoroacetic acid, citric acid, benzoic acid, 3-(4-hydroxybenzoyl)benzoic acid, cinnamic acid, mandelic acid, arylsulfonic acid, methanesulfonic acid, ethanesulfonic acid, 1,2-ethanedisulfonic acid, 2-hydroxyethanesulfonic acid, benzenesulfonic acid, 2-naphthalenesulfonic acid, 4-methylbicyclo-[2.2.2]oct-2-ene-1-carboxylic acid, glucoheptonic acid, 4,4'-methylenebis-(3-hydroxy-2-ene-1-carboxylic acid), 3-phenylpropionic acid, trimethylacetic acid, tertiary butylacetic acid, lauryl sulfuric acid, gluconic acid, glutamic acid, hydroxynaphthoic acid, salicylic acid, stearic acid and muconic acid. See Stahl, P. Heinrich, and Camille G. Wermuth, *Handbook of Pharmaceutical Salts: Properties, Selection and Use*, Verlag Helvetica Chimica Acta, 2008. In some embodiments, other acids, such as oxalic, while not in themselves pharmaceutically acceptable, are employed in the preparation of salts useful as intermediates in obtaining the Trapidil derivatives disclosed herein or solvate thereof and their pharmaceutically acceptable acid addition salts.

In some embodiments, those Trapidil derivatives described herein which comprise a free acid group react with a suitable base, such as the hydroxide, carbonate, bicarbonate, sulfate, of a pharmaceutically acceptable metal cation, with ammonia, or with a pharmaceutically acceptable organic primary, secondary, tertiary, or quaternary amine Representative salts include the alkali or alkaline earth salts, like lithium, sodium, potassium, calcium, and magnesium, and aluminum salts and the like. Illustrative examples of bases include sodium hydroxide, potassium hydroxide, choline hydroxide, sodium carbonate, $N^+(C_{1-4}\ alkyl)_4$, and the like.

Representative organic amines useful for the formation of base addition salts include ethylamine, diethylamine, ethylenediamine, ethanolamine, diethanolamine, piperazine and the like. It should be understood that the Trapidil derivatives described herein also include the quaternization of any basic nitrogen-containing groups they contain. In some embodiments, water or oil-soluble or dispersible products are obtained by such quaternization.

Solvates

In some embodiments, the Trapidil derivatives described herein exist as solvates. Provided for in certain embodiments herein, are methods of treating Parkinson's disease and movement disorders associated with Parkinson's disease comprising administering such solvates. Provided for in certain embodiments herein, are methods of treating Parkinson's disease and movement disorders associated with Parkinson's disease comprising administering such solvates as pharmaceutical compositions. In some embodiments, the movement disorder is dyskinesia. In some embodiments, the dyskinesia is levodopa-induced dyskinesia (LID), diphasic dyskinesia, or peak-dose dyskinesia. In some embodiments, the movement disorder is dystonia. In some embodiments, the dystonia is generalized dystonia, focal dystonia, segmental dystonia, or acute dystonia. In some embodiments, the movement disorder is akathisia. In some embodiments, the akathisia is acute akathisia, chronic akathisia, pseudo-akathisia, or withdrawal akathisia.

Solvates contain either stoichiometric or non-stoichiometric amounts of a solvent, and, in some embodiments, are formed during the process of crystallization with pharmaceutically acceptable solvents such as water, ethanol, and the like. Hydrates are formed when the solvent is water, or alcoholates are formed when the solvent is alcohol. Solvates of the Trapidil derivatives described herein can be conveniently prepared or formed during the processes described herein. By way of example only, hydrates of the Trapidil derivatives described herein can be conveniently prepared by recrystallization from an aqueous/organic solvent mixture, using organic solvents including, but not limited to, dioxane, tetrahydrofuran or methanol. In addition, the Trapidil derivatives provided herein can exist in unsolvated as well as solvated forms. In general, the solvated forms are considered equivalent to the unsolvated forms for the purposes of the Trapidil derivatives and methods provided herein.

Pharmaceutical Compositions and Dosing

Provided herein are pharmaceutical compositions comprising a Trapidil derivative disclosed herein, in a pharmaceutically acceptable vehicle, carrier, diluent, or excipient, or a mixture thereof; and one or more pharmaceutically acceptable excipients or carriers.

The pharmaceutical compositions provided herein may be provided in unit-dosage forms or multiple-dosage forms. Unit-dosage forms, as used herein, refer to physically discrete units suitable for administration to human and animal subjects and packaged individually as is known in the art. Each unit-dose contains a predetermined quantity of the active ingredient(s) sufficient to produce the desired therapeutic effect, in association with the required pharmaceutical carriers or excipients. Examples of unit-dosage forms include ampules, syringes, and individually packaged tablets and capsules. Unit-dosage forms may be administered in fractions or multiples thereof. A multiple-dosage form is a plurality of identical unit-dosage forms packaged in a single container to be administered in segregated unit-dosage form. Examples of multiple-dosage forms include vials, bottles of tablets or capsules, or bottles of pints or gallons.

The pharmaceutical compositions provided herein may be administered at once, or multiple times at intervals of time. It is understood that the precise dosage and duration of treatment may vary with the age, weight, and condition of the patient being treated, and may be determined empirically using known testing protocols or by extrapolation from in vivo or in vitro test or diagnostic data. It is further understood that for any particular individual, specific dosage regimens should be adjusted over time according to the individual need and the professional judgment of the person administering or supervising the administration of the formulations.

In the case wherein the Parkinson's disease or movement disorder associated with Parkinson's disease does not improve, upon the doctor's discretion the administration of the Trapidil derivatives may be administered chronically, that is, for an extended period of time, including throughout the duration of a patient's life in order to ameliorate or otherwise control or limit the symptoms of the Parkinson's disease or movement disorder associated with Parkinson's disease.

In some embodiments, the pharmaceutical compositions described herein are administered for therapeutic applications. In some embodiments, the pharmaceutical composition is administered once per day, twice per day, three times per day or more. The pharmaceutical composition is administered daily, every day, every alternate day, five days a week, once a week, every other week, two weeks per month, three weeks per month, once a month, twice a month, three times per month, or more. The pharmaceutical composition is administered for at least 1 month, 2 months, 3 months, 4 months, 5 months, 6 months, 7 months, 8 months, 9 months, 10 months, 11 months, 12 months, 18 months, 2 years, 3 years, or more.

In the case wherein the Parkinson's disease or movement disorder associated with Parkinson's disease does improve, upon the doctor's discretion the administration of the composition is given continuously; alternatively, the dose of the composition being administered is temporarily reduced or temporarily suspended for a certain length of time (i.e., a "drug holiday"). In some embodiments, the length of the drug holiday varies between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday is from 10%-100%, including, by way of example only, 10%, 15%, 20%, 25%, 30%, 35%, 40%, 45%, 50%, 55%, 60%, 65%, 70%, 75%, 80%, 85%, 90%, 95%, or 100%.

Once improvement of the Parkinson's disease or movement disorder associated with Parkinson's disease has occurred, a maintenance dose is administered if necessary. Subsequently, the dosage or the frequency of administration, or both, can be reduced, as a function of the symptoms, to a level at which the improved Parkinson's disease or movement disorder associated with Parkinson's disease is retained.

In some embodiments, the amount of a Trapidil derivative administered to treat the Parkinson's disease or movement disorder associated with Parkinson's disease varies depending upon factors such as the particular Trapidil derivative, the severity of the disease, the identity (e.g., weight) of the subject or host in need of treatment, but nevertheless is routinely determined in a suitable method according to the particular circumstances surrounding the case, including, e.g., the specific agent being administered, the route of administration, and the subject or host being treated. In some embodiments, the desired dose is conveniently presented in a single dose or as divided doses administered simultaneously (or over a short period of time) or at appropriate intervals, for example as two, three, four or more sub-doses per day.

The foregoing ranges are merely suggestive, as the number of variables in regard to an individual treatment regime is large, and considerable excursions from these recommended values are not uncommon Such dosages is altered depending on a number of variables, not limited to the activity of the Trapidil derivative, the movement disorder associated with Parkinson's disease treated, the mode of administration, the requirements of the individual subject, the severity of the Parkinson's disease or movement disorder associated with Parkinson's disease being treated, and the judgment of the practitioner.

In some embodiments, toxicity and therapeutic efficacy of such therapeutic regimens are determined by standard pharmaceutical procedures in cell cultures or experimental animals, including, but not limited to, the determination of the LD50 (the dose lethal to 50% of the population) and the ED50 (the dose therapeutically effective in 50% of the population). The dose ratio between the toxic and therapeutic effects is the therapeutic index and it is expressed as the ratio between LD50 and ED50. Trapidil derivatives exhibiting high therapeutic indices are preferred. The data obtained from cell culture assays and animal studies are used in formulating a range of dosage for use in human. The dosage of such Trapidil derivatives lies preferably within a range of circulating concentrations that include the ED50 with minimal toxicity. The dosage varies within this range depending upon the dosage form employed and the route of administration utilized.

In some embodiments, the Trapidil derivative disclosed herein is administered in a single dose. In some embodiments, the Trapidil derivative disclosed herein is administered in several doses, e.g., in 2, 3, 4, 5, 6, or more doses per day. In some embodiments, the Trapidil derivative disclosed herein is administered intravenously or subcutaneously. In such instances, the intravenous or subcutaneous administration dose ranges from about 1 mg/kg body weight to about 10 mg/kg body weight, from about 2 mg/kg body weight to about 10 mg/kg body weight, or from about 4 mg/kg body weight to about 8 mg/kg body weight.

In some embodiments, pharmaceutical compositions are formulated in a conventional manner using one or more physiologically acceptable carriers including excipients and auxiliaries which facilitate processing of the active compounds into preparations which can be used pharmaceutically. Proper formulation is dependent upon the route of administration chosen. Any of the well-known techniques, carriers, and excipients are used as suitable and as understood in the art. A summary of pharmaceutical compositions described herein are found, for example, in *Remington: The Science and Practice of Pharmacy*, Nineteenth Ed (Easton, Pa.: Mack Publishing Company, 1995); Hoover, John E., *Remington's Pharmaceutical Sciences*, Mack Publishing Co., Easton, Pennsylvania 1975; Liberman, H. A. and Lachman, L., Eds., *Pharmaceutical Dosage Forms*, Marcel Decker, New York, N.Y., 1980; and *Pharmaceutical Dosage Forms and Drug Delivery* Systems, Seventh Ed. (Lippincott Williams & Wilkins 1999), herein incorporated by reference in their entirety.

A pharmaceutical composition, as used herein, refers to a mixture of a Trapidil derivative disclosed herein, with other chemical components, such as carriers, stabilizers, diluents, dispersing agents, suspending agents, thickening agents, and/or excipients. The pharmaceutical composition or combination facilitates administration of the compound to an organism. In practicing the methods of treatment or use provided herein, therapeutically effective amounts of a Trapidil derivative disclosed herein are administered in a pharmaceutical composition to a mammal having Parkinson's disease or movement disorders associated with Parkinson's disease. Preferably, the mammal is a human. A therapeutically effective amount can vary widely depending on the severity of the Parkinson's disease or movement disorders associated with Parkinson's disease, the age and relative health of the subject, the potency of the Trapidil derivative used and other factors. Methods of Use Disclosed herein, in certain embodiments, are methods of treating Parkinson's disease and movement disorders associated with Parkinson's disease in a subject in need thereof, comprising administering to the subject a Trapidil derivative of Formula (I), or a pharmaceutically acceptable salt, co-crystal or solvate thereof:

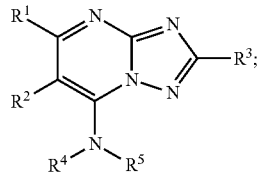

Formula (I)

wherein
$R^1$ is —$CH_3$, —$CD_3$, —$CHD_2$, or —$CH_2D$;
$R^2$ is hydrogen or -D;
$R^3$ is hydrogen or -D;

$R^4$ is hydrogen; —$CH_2CH_3$; —$CD_2CD_3$; —$CD_2CH_3$; —$CH_2CD_3$; —$CDHCH_3$; —$CH_2CDH_2$; —$CH_2CD_2H$; —$CD_2CDH_2$; —$CD_2CD_2H$; —$CDHCD_3$; —$CDHCDH_2$; or —$CDHCD_2H$;
$R^5$ is hydrogen; —$CH_2CH_3$; —$CD_2CD_3$; —$CD_2CH_3$; —$CH_2CD_3$; —$CDHCH_3$; —$CH_2CDH_2$; —$CH_2CD_2H$; —$CD_2CDH_2$; —$CD_2CD_2H$; —$CDHCD_3$; —$CDHCDH_2$; or —$CDHCD_2H$;

wherein at least one of $R^1$, $R^2$, $R^3$, $R^4$, or $R^5$, comprises at least one deuterium atom.

In some embodiments of a compound of Formula (I), or a pharmaceutically acceptable salt, co-crystal or solvate thereof, $R^1$ is —$CH_3$. In some embodiments of a compound of Formula (I), or a pharmaceutically acceptable salt, co-crystal or solvate thereof, $R^1$ is —$CD_3$. In some embodiments of a compound of Formula (I), or a pharmaceutically acceptable salt, co-crystal or solvate thereof, $R^1$ is —$CHD_2$. In some embodiments of a compound of Formula (I), or a pharmaceutically acceptable salt, co-crystal or solvate thereof, $R^1$ is —$CH_2D$.

In some embodiments of a compound of Formula (I), or a pharmaceutically acceptable salt, co-crystal or solvate thereof, $R^2$ is hydrogen. In some embodiments of a compound of Formula (I), or a pharmaceutically acceptable salt, co-crystal or solvate thereof, $R^2$ is -D.

In some embodiments of a compound of Formula (I), or a pharmaceutically acceptable salt, co-crystal or solvate thereof, $R^3$ is hydrogen. In some embodiments of a compound of Formula (I), or a pharmaceutically acceptable salt, co-crystal or solvate thereof, co-crystal or solvate thereof, $R^3$ is -D.

In some embodiments of a compound of Formula (I), or a pharmaceutically acceptable salt, co-crystal or solvate thereof, $R^4$ is hydrogen. In some embodiments of a compound of Formula (I), or a pharmaceutically acceptable salt, co-crystal or solvate thereof, $R^4$ is —$CH_2CH_3$. In some embodiments of a compound of Formula (I), or a pharmaceutically acceptable salt, co-crystal or solvate thereof, $R^4$ is —$CD_2CD_3$. In some embodiments of a compound of Formula (I), or a pharmaceutically acceptable salt, co-crystal or solvate thereof, $R^4$ is —$CD_2CH_3$. In some embodiments of a compound of Formula (I), or a pharmaceutically acceptable salt, co-crystal or solvate thereof, $R^4$ is —$CH_2CD_3$. In some embodiments of a compound of Formula (I), or a pharmaceutically acceptable salt, co-crystal or solvate thereof, $R^4$ is —$CDHCH_3$. In some embodiments of a compound of Formula (I), or a pharmaceutically acceptable salt, co-crystal or solvate thereof, $R^4$ is —$CH_2CDH_2$. In some embodiments of a compound of Formula (I), or a pharmaceutically acceptable salt, co-crystal or solvate thereof, $R^4$ is —$CH_2CD_2H$. In some embodiments of a compound of Formula (I), or a pharmaceutically acceptable salt, co-crystal or solvate thereof, $R^4$ is —$CD_2CDH_2$. In some embodiments of a compound of Formula (I), or a pharmaceutically acceptable salt, co-crystal or solvate thereof, $R^4$ is —$CD_2CD_2H$. In some embodiments of a compound of Formula (I), or a pharmaceutically acceptable salt, co-crystal or solvate thereof, $R^4$ is —$CDHCD_3$. In some embodiments of a compound of Formula (I), or a pharmaceutically acceptable salt, co-crystal or solvate thereof, $R^4$ is —$CDHCDH_2$. In some embodiments of a compound of Formula (I), or a pharmaceutically acceptable salt, co-crystal or solvate thereof, $R^4$ is —$CDHCD_2H$.

In some embodiments of a compound of Formula (I), or a pharmaceutically acceptable salt, co-crystal or solvate thereof, $R^5$ is —$CH_2CH_3$. In some embodiments of a compound of Formula (I), or a pharmaceutically acceptable salt, co-crystal or solvate thereof, $R^5$ is —$CD_2CD_3$. In some embodiments of a compound of Formula (I), or a pharmaceutically acceptable salt, co-crystal or solvate thereof, $R^5$ is —$CD_2CH_3$. In some embodiments of a compound of Formula (I), or a pharmaceutically acceptable salt, co-crystal or solvate thereof, $R^5$ is —$CH_2CD_3$. In some embodiments of a compound of Formula (I), or a pharmaceutically acceptable salt, co-crystal or solvate thereof, $R^5$ is —$CDHCH_3$. In some embodiments of a compound of Formula (I), or a pharmaceutically acceptable salt, co-crystal or solvate thereof, $R^5$ is —$CH_2CDH_2$. In some embodiments of a compound of Formula (I), or a pharmaceutically acceptable salt, co-crystal or solvate thereof, $R^5$ is —$CH_2CD_2H$. In some embodiments of a compound of Formula (I), or a pharmaceutically acceptable salt, co-crystal or solvate thereof, $R^5$ is —$CD_2CDH_2$. In some embodiments of a compound of Formula (I), or a pharmaceutically acceptable salt, co-crystal or solvate thereof, $R^5$ is —$CD_2CD_2H$. In some embodiments of a compound of Formula (I), or a pharmaceutically acceptable salt, co-crystal or solvate thereof, $R^5$ is —$CDHCD_3$. In some embodiments of a compound of Formula (I), or a pharmaceutically acceptable salt, co-crystal or solvate thereof, $R^5$ is —$CDHCDH_2$. In some embodiments of a compound of Formula (I), or a pharmaceutically acceptable salt, co-crystal or solvate thereof, $R^5$ is —$CDHCD_2H$. In some embodiments of a compound of Formula (I), or a pharmaceutically acceptable salt, co-crystal or solvate thereof, any position represented as D has deuterium enrichment of at least 98%.

In some embodiments, the methods further comprise treating the subject with an additional therapeutic agent. In some embodiments, the methods comprise administering the Trapidil derivative disclosed herein and the additional therapeutic agent separately or together.

In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide.

In some embodiments, the subject is diagnosed with Parkinson's disease. In some embodiments, a movement disorder associated with Parkinson's disease is a movement disorder resulting from the treatment of Parkinson's disease. In some embodiments, the movement disorder is an adverse drug reaction or negative side effect of a drug used to treat Parkinson's disease, such as levodopa.

In some embodiments the subject to be treated with the Trapidil derivatives described herein is diagnosed with or suspected of having Parkinson's disease. In some embodiments, of the subject presents with the motor symptoms of Parkinson's disease. In some embodiments, the movement disorder is presented in the subject as an adverse drug reaction to a therapeutic agent useful to treat Parkinson's disease, such as levodopa.

In some embodiments, the subject is diagnosed with Parkinson's using the Unified Parkinson's Disease Rating Scale (UPDRS), or the Movement Disorder Society (MDS)-UPDRS. In some embodiments, the subject has scored at least a 2, 3, or 4 on part three of the UPDRS or MDS-UPDRS (motor examination section). In some embodiments, the subject has scored at least a 2, 3, or 4 on part 4 of the of the UPDRS or MDS-UPDRS (motor complications score). In some embodiments, the subject is not diagnosed with Parkinson's disease. In some embodiments, the subject is suspected of having Parkinson's disease but is not diagnosed with Parkinson's disease.

In some embodiments, the subject is human. In some embodiments, the subject is a pediatric subject. In some embodiments, a "pediatric subject" is a human that is under about 15 years of age. In some embodiments, the subject is between 5 and 10, 6 and 11, 7 and 12, 8 and 13, 9 and 14, 10 and 15 years of age. In some embodiments, the subject is not a pediatric subject. In some embodiments, the subject is at least or about 40-45, 45-50, 50-55, 55-60, 60-65, 65-70, 70-75, or 75-80 years or age, or more. In some embodiments, the subject is a female. In some embodiments, the subject is a male.

Parkinson's Disease and Movement Disorders Associated with Parkinson's Disease

Disclosed herein, in certain embodiments, are methods of treating Parkinson's disease and movement disorders associated with Parkinson's disease in a subject in need thereof, comprising administering a Trapidil derivative according to Formula (I) disclosed herein, or a pharmaceutically acceptable salt, co-crystal or solvate thereof, to a subject. In some embodiments, the Trapidil derivatives are isotopically-labelled Trapidil derivatives. In some embodiments, the isotopically-labelled Trapidil derivatives are deuterated Trapidil compounds. In some embodiments, the method further comprises administering an additional therapeutic agent to the subject. In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAO inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide.

In some embodiments, the movement disorder associated with Parkinson's disease is dyskinesia, akinesia, akathisia, chorea, psychomotor hyperactivity, abnormal involuntary movements, acute dyskinesia, oral dyskinesia, tongue protrusions, facial jerks, shuddering attacks, motor restlessness, motor unrest compulsive, levodopa-induced dyskinesia, dystonias, drug-induced parkinsonism, pseudo parkinsonism, bradykinesia, tremors, or any combinations thereof. In some embodiments, treating Parkinson's disease comprises treating symptoms of Parkinson's disease. In some embodiments, the symptom of Parkinson's disease is tremors, bradykinesia, dystonias, rigidity, or any combinations thereof.

Dyskinesia

In some embodiments, the movement disorder associated with Parkinson's disease is dyskinesia. In some embodiments, dyskinesia is levodopa-induced dyskinesia (LID), diphasic dyskinesia, or peak-dose dyskinesia. In some embodiments, dyskinesia is levodopa-induced dyskinesia (LID). In some embodiments, dyskinesia is diphasic dyskinesia. In some embodiments, dyskinesia is peak-dose dyskinesia.

Dyskinesia refers to a category of movement disorders that are characterized by involuntary muscle movements, including movements similar to tics, dystonia, chorea and abnormal involuntary movements. Dyskinesia includes for example, from a slight tremor of the hands to an uncontrollable movement of the upper body or lower extremities. In some embodiments, dyskinesia is a drug-induced dyskinesia. In some embodiments, dyskinesia is a side effect of levodopa treatment. Dyskinesia can be a symptom of other conditions besides Parkinson's disease.

In some embodiments, dyskinesia is levodopa-induced dyskinesia (LID). Levodopa-induced dyskinesia refers to a form of dyskinesia associated with use of levodopa in the treatment for the motor symptoms of Parkinson's disease. LID often involves hyperkinetic movements, including chorea, dystonia, and athetosis.

In some embodiments, dyskinesia is diphasic dyskinesia. Diphasic dyskinesia refers to a type of levodopa-induced dyskinesia that develops when plasma levodopa levels are rising or falling, but not with the peak levels. Diphasic dyskinesia primarily occurs in the lower limbs and is often dystonic or ballistic. This form of dyskinesia does not respond to reductions in the dosage of levodopa.

In some embodiments, dyskinesia is peak-dose dyskinesia. Peak-dose dyskinesia refers to a form of levodopa-induced dyskinesia that correlates with the peak plasma levels of levodopa. Peak-dose dyskinesia involves the head, truck, and limbs, and sometimes respiratory muscles. Peak-dose dyskinesia responds to reductions in the dosage of levodopa but at the cost of deterioration of Parkinsonism.

In some embodiments, disclosed herein are methods of treating or preventing dyskinesia in a subject in need thereof, comprising administering a therapeutically effective dose of a Trapidil derivative according to Formula I disclosed herein, or a pharmaceutically salt, co-crystal or solvate thereof, to the subject. In some embodiments, methods further comprise administering a therapeutically effective amount of an additional therapeutic agent (e.g., levodopa).

In some embodiments, methods further comprise administering a sub-therapeutically effective amount of an additional therapeutic agent (e.g., levodopa). In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide.

In some embodiments, the dyskinesia is, levodopa-induced dyskinesia (LID), diphasic dyskinesia, or peak-dose dyskinesia.

Disclosed herein, in certain embodiments, are methods of treating or preventing levodopa-induced dyskinesia (LID) in a subject in need thereof, comprising administering a therapeutically effective dose of a Trapidil derivative according to Formula I disclosed herein, or a pharmaceutically salt, co-crystal or solvate thereof, to the subject. In some embodiments, methods further comprise administering a therapeutically effective amount of an additional therapeutic agent (e.g., levodopa). In some embodiments, methods further comprise administering a sub-therapeutically effective amount of an additional therapeutic agent (e.g., levodopa). In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide.

Disclosed herein, in certain embodiments, are methods of treating or preventing diphasic dyskinesia in a subject in need thereof, comprising administering a therapeutically effective dose of a Trapidil derivative according to Formula I disclosed herein, or a pharmaceutically salt, co-crystal or solvate thereof, to the subject. In some embodiments, methods further comprise administering a therapeutically effective amount of an additional therapeutic agent (e.g., levodopa). In some embodiments, methods further comprise administering a sub-therapeutically effective amount of an additional therapeutic agent (e.g., levodopa). In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa. In some embodiments, the additional therapeutic agent is a dopa decarboxylase inhibitor comprising carbidopa or benserazide.

Disclosed herein, in certain embodiments, are methods of treating or preventing peak-dose dyskinesia in a subject in need thereof, comprising administering a therapeutically effective dose of a Trapidil derivative according to Formula I disclosed herein, or a pharmaceutically salt, co-crystal or solvate thereof, to the subject. In some embodiments, methods further comprise administering a therapeutically effective amount of an additional therapeutic agent (e.g., levodopa). In some embodiments, methods further comprise administering a sub-therapeutically effective amount of an additional therapeutic agent (e.g., levodopa). In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide.

Dystonia

In some embodiments, the movement disorder associated with Parkinson's disease, or symptom of Parkinson's disease, is dystonia. In some embodiments, dystonia is generalized dystonia, focal dystonia, segmental dystonia, or acute dystonia. In some embodiments, dystonia is generalized dystonia. In some embodiments, dystonia is focal dystonia. In some embodiments, dystonia is segmental dystonia. In some embodiments, dystonia is acute dystonia.

Dystonia refers to a movement disorder in which sustained muscle contractions cause twisting and repetitive movements or abnormal postures. In some embodiments, the movements resemble tremors. Dystonia is often initiated or worsened by voluntary movements, and symptoms "overflow" into adjacent muscles. In some embodiments, dystonia is drug-induced dystonia. Dystonic reactions are characterized by intermittent spasmodic or sustained involuntary contractions of the muscles in the face, neck, trunk, pelvis, extremities, and larynx.

In some embodiments, dystonia is generalized dystonia. Generalized dystonia refers to a form of dystonia that affects most or all of the body.

In some embodiments, dystonia is focal dystonia. Focal dystonia refers to a form of dystonia that is localized to a specific part of the body. In some embodiments, focal dystonia is multifocal dystonia which involves two or more unrelated body parts.

In some embodiments, dystonia is segmental dystonia. Segmental dystonia refers to a form of dystonia that affects two or more adjacent parts of the body.

In some embodiments, dystonia is acute dystonia. Acute dystonia refers to a form of dystonia consisting of sustained, often painful muscular spasms, producing twisting abnormal postures.

Disclosed herein, in certain embodiments, are methods of treating or preventing dystonia in a subject in need thereof comprising administering a therapeutically effective dose of a Trapidil derivative according to Formula I disclosed herein, or a pharmaceutically salt, co-crystal or solvate thereof, to the subject. In some embodiments, methods further comprise administering a therapeutically effective amount of an additional therapeutic agent (e.g., levodopa). In some embodiments, methods further comprise administering a sub-therapeutically effective amount of an additional therapeutic agent (e.g., levodopa). In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide. In some embodiments, dystonia is generalized dystonia, focal dystonia, segmental dystonia, or acute dystonia. In some embodiments, disclosed herein are methods of treating or preventing generalized dystonia with administration of a therapeutic effective dose of a derivative of Trapidil, or a pharmaceutically acceptable salt thereof, and/or an additional therapeutic agent (e.g., levodopa) In some embodiments, disclosed herein are methods of treating or preventing focal dystonia with administration of a therapeutic effective dose of a Trapidil derivative, or a pharmaceutically acceptable salt thereof. In some embodiments, disclosed herein are methods of treating or preventing segmental dystonia with administration of a therapeutic effective dose of a Trapidil derivative, or a pharmaceutically acceptable salt thereof, and/or an additional therapeutic agent (e.g., levodopa). In some embodiments, disclosed herein are methods of treating or preventing acute dystonia with administration of a therapeutic effective dose of a Trapidil derivative disclosed herein.

Akathisia

In some embodiments, the movement disorder associated with Parkinson's disease is akathisia. In some embodiments, akathisia is acute akathisia, chronic akathisia, pseudoakathisia, or withdrawal or "rebound" akathisia. In some embodiments, akathisia is acute akathisia. In some embodiments, akathisia is chronic akathisia. In some embodiments, akathisia is pseudoakathisia. In some embodiments, akathisia is withdrawal or "rebound" akathisia.

In some embodiments the movement disorder is akathisia. In some embodiments, akathisia is a movement disorder characterized by a feeling of inner restlessness and a compelling need to be in constant motion, as well as by actions such as rocking while standing or sitting, lifting the feet as if marching on the spot, and crossing and uncrossing the legs while sitting. In some embodiments, akathisia is drug-induced.

In some embodiments, akathisia is acute akathisia. Acute akathisia refers to a form of akathisia that develops soon after 1) starting medication or following dose increase, 2) switching to a high-potency drug, or 3) withdrawal of a medication. In some embodiments, duration of acute akathisia is less than six months and includes intense dysphoria, awareness of restlessness and complex and semi-purposeful motor fidgetiness.

In some embodiments, akathisia is chronic akathisia. Chronic akathisia refers to a form of akathisia that persists for over six months after last dosage increment of the drug. In some embodiments, chronic akathisia includes mild dysphoria, awareness of restlessness, motor fidgetiness with stereotypes movement and limb and orofacial dyskinesia.

In some embodiments, akathisia is pseudoakathisia. In some embodiments, pseudoakathisia is a late stage of chronic akathisia. Exemplary symptoms include motor manifestations with subjective component, motor fidgetiness with stereotyped movement and limb and orofacial dyskinesia.

In some embodiments, akathisia is withdrawal or "rebound" akathisia. In some embodiments, withdrawal or "rebound" akathisia refers to akathisia associated with switching drugs with an onset of usually within six weeks of discontinuation or dose decrease of the drug.

Disclosed herein, in certain embodiments, are methods of treating akathisia in a subject in need thereof comprising administering a therapeutically effective dose of a Trapidil derivative according to Formula I disclosed herein, or a pharmaceutically salt, co-crystal or solvate thereof, to the subject. In some embodiments, methods further comprise administering a therapeutically effective amount of an additional therapeutic agent (e.g., levodopa). In some embodiments, methods further comprise administering a sub-therapeutically effective amount of an additional therapeutic agent (e.g., levodopa). In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide. In some embodiments, akathisia is acute akathisia, chronic akathisia, pseudoakathisia, or withdrawal or "rebound" akathisia.

In some embodiments, disclosed herein are methods of treating or preventing acute akathisia with administration of a therapeutic effective dose of a Trapidil derivative disclosed herein, and/or an additional therapeutic agent (e.g., levodopa).

In some embodiments, disclosed herein are methods of treating or preventing chronic akathisia with administration of a therapeutic effective dose of a Trapidil derivative disclosed herein, and/or an additional therapeutic agent (e.g., levodopa).

In some embodiments, disclosed herein are methods of treating or preventing pseudoakathisia with administration of a therapeutic effective dose of a Trapidil derivative disclosed herein, and/or an additional therapeutic agent (e.g., levodopa).

In some embodiments, disclosed herein are methods of treating or preventing withdrawal or "rebound" akathisia with administration of a therapeutic effective dose of a Trapidil derivative disclosed herein, and/or an additional therapeutic agent (e.g., levodopa).

Combination Therapy Treatments with Trapidil Derivatives

Disclosed herein, in certain embodiments, are methods of treating Parkinson's disease and movement disorders associated with Parkinson's disease in a subject in need thereof, comprising administering to the subject a therapeutically effective dose of a Trapidil derivative according to Formula I disclosed herein, or a pharmaceutically salt, co-crystal or solvate thereof, to the subject. In some embodiments, are methods of treating or preventing movement disorders associated with levodopa utilization. Disclosed herein, in certain embodiments, are methods of treating Parkinson's disease in a subject in need thereof comprising administering to the subject a therapeutically effective dose of a Trapidil derivative according to Formula I disclosed herein, or a pharmaceutically salt, co-crystal or solvate thereof, to the subject and an additional therapeutic agent. In some embodiments, the additional therapeutic agent is an agent used for treating Parkinson's disease.

In some embodiments, the additional therapeutic agent is a dopamine precursor. In some embodiments, the dopamine precursor is levodopa. In some embodiments, the additional therapeutic agent is a dopamine agonist. In some embodiments, the dopamine agonist is pramipexole, ropinirole, rotigotine, pergolide, bromocriptine, piribedile, lisuride, or apomorphine. In some embodiments, the additional therapeutic agent is a dopamine agonist comprising pramipexole, ropinirole, rotigotine, pergolide, bromocriptine, piribedile, lisuride, or apomorphine. In some embodiments, the additional therapeutic agent is a Catechol O-methyl transferase (COMT) inhibitor. In some embodiments, the COMT inhibitor is entacapone or tolcapone. In some embodiments, the COMT inhibitor is entacapone, tolcapone, or opicapone. In some embodiments, the additional therapeutic agent is a Catechol O-methyl transferase (COMT) inhibitor comprising entacapone, tolcapone, or opicapone. In some embodiments, the additional therapeutic agent is a monoamine oxidase B (MAOB) inhibitor. In some embodiments, the MAOB inhibitor is selegiline or rasagiline. In some embodiments, the additional therapeutic agent is a monoamine oxidase B (MAOB) inhibitor comprising selegiline or rasagiline. In some embodiments, the additional therapeutic agent is a dopa decarboxylase inhibitor. In some embodiments, the dopa decarboxylase inhibitor is carbidopa or benserazide. In some embodiments, the additional therapeutic agent is a dopa decarboxylase inhibitor comprising carbidopa or benserazide.

In some embodiments, the additional therapeutic agent is administered orally. In some embodiments, the additional therapeutic agent is administered intravenously or subcutaneously.

In some embodiments, the Trapidil derivative according to Formula I disclosed herein, or a pharmaceutically salt, co-crystal or solvate thereof, and the additional therapeutic agent are administered simultaneously. In some embodiments, the Trapidil derivative according to Formula I disclosed herein, or a pharmaceutically salt, co-crystal or solvate thereof, and the additional therapeutic agent are administered sequentially. In some embodiments, the Trapidil derivative according to Formula I disclosed herein, or a pharmaceutically salt, co-crystal or solvate thereof, is administered before the additional therapeutic agent. In some embodiments, the Trapidil derivative according to Formula I disclosed herein, or a pharmaceutically salt, co-crystal or solvate thereof, is administered after the additional therapeutic agent. In some embodiments, the Trapidil derivative according to Formula I disclosed herein, or a pharmaceutically salt, co-crystal or solvate thereof, and the additional therapeutic agent are administered in a unified dosage form. In some embodiments, the Trapidil derivative according to Formula I disclosed herein, or a pharmaceutically salt, co-crystal or solvate thereof, and the additional therapeutic agent are administered in separate dosage forms.

Kits/Articles of Manufacture

For use in the therapeutic applications described herein, kits and articles of manufacture are also described herein. Such kits can comprise a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. The containers can be formed from a variety of materials such as glass or plastic.

For example, the container(s) can comprise a Trapidil derivative disclosed herein optionally in a composition or in combination with another agent as disclosed herein (e.g., levodopa and/or carbidopa). The container(s) optionally have a sterile access port (for example the container can be an intravenous solution bag or a vial having a stopper pierceable by a hypodermic injection needle). Such kits optionally comprise a compound with an identifying description or label or instructions relating to its use in the methods described herein.

A kit will typically comprise one or more additional containers, each with one or more of various materials (such as reagents, optionally in concentrated form, and/or devices) desirable from a commercial and user standpoint for use of a Trapidil derivative disclosed herein. Non-limiting examples of such materials include, but are not limited to, buffers, diluents, filters, needles, syringes; carrier, package, container, vial and/or tube labels listing contents and/or instructions for use, and package inserts with instructions for use. A set of instructions will also typically be included.

A label can be on or associated with the container. A label can be on a container when letters, numbers or other characters forming the label are attached, molded or etched into the container itself; a label can be associated with a container when it is present within a receptacle or carrier that also holds the container, e.g., as a package insert. A label can be used to indicate that the contents are to be used for a specific therapeutic application. The label can also indicate directions for use of the contents, such as in the methods described herein. These other therapeutic agents may be used, for example, in the amounts indicated in the Physicians' Desk Reference (PDR) or as otherwise determined by one of ordinary skill in the art.

Definitions

To facilitate understanding of the disclosure set forth herein, a number of terms are defined below.

As used herein, the singular forms "a," "an," and "the" may refer to plural articles unless specifically stated otherwise. Generally, the nomenclature used herein and the laboratory procedures in organic chemistry, medicinal chemistry, and pharmacology described herein are those well-known and commonly employed in the art. Unless defined otherwise, all technical and scientific terms used herein generally have the same meaning as commonly understood by one of ordinary skill in the art to which this disclosure belongs. In the event that there is a plurality of definitions for a term herein, those in this section prevail unless stated otherwise.

The term "subject" refers to any animal, preferably a mammal, including a human or non-human. The terms "subject" and "patient" are used interchangeably herein in reference, for example, to a mammalian subject, such as a human subject. None of the terms are to be interpreted as requiring the supervision of a medical professional (e.g., a doctor, nurse, physician's assistant, orderly, hospice worker).

The terms "treat," "treating," and "treatment" are meant to include alleviating or abrogating a movement disorder, disease, or condition; or one or more of the symptoms associated with the movement disorder, disease, or condition; or alleviating or eradicating the cause(s) of the disorder, disease, or condition itself.

The terms "prevent," "preventing," and "prevention" refer to a method of delaying or precluding the onset of Parkinson's disease or a movement disorder associated with Parkinson's disease; and/or its attendant symptoms, barring a subject from acquiring a disease or reducing a subject's risk of acquiring Parkinson's disease or a movement disorder associated with Parkinson's disease.

The term "therapeutically effective amount" refers to the amount of a Trapidil derivative disclosed herein that, when administered, is sufficient to prevent development of, or alleviate to some extent, one or more of the symptoms of the Parkinson's disease or movement disorder associated with Parkinson's disease. The term "therapeutically effective amount" also refers to the amount of a Trapidil derivative disclosed herein that is sufficient to elicit the biological or medical response of a cell, tissue, system, animal, or human that is being sought by a researcher, veterinarian, medical doctor, or clinician.

The term "sub-therapeutically effective amount" refers to the amount of a therapeutic agent that is below a dosage amount that is considered therapeutically effective for the treatment of an intended indication. In some embodiments, the therapeutic agent is levodopa.

The term "pharmaceutically acceptable carrier," "pharmaceutically acceptable excipient," "physiologically acceptable carrier," or "physiologically acceptable excipient" refers to a pharmaceutically-acceptable material, composition, or vehicle, such as a liquid or solid filler, diluent, excipient, solvent, or encapsulating material. Each component must be "pharmaceutically acceptable" in the sense of being compatible with the other ingredients of a pharmaceutical formulation. It must also be suitable for use in contact with the tissue or organ of humans and animals without excessive toxicity, irritation, allergic response, immunogenicity, or other problems or complications, commensurate with a reasonable benefit/risk ratio. See, *Remington: The Science and Practice of Pharmacy*, 21st Edition; Lippincott Williams & Wilkins Philadelphia, PA, 2005; *Handbook of Pharmaceutical Excipients*, 5th Edition; Rowe et al., Eds., The Pharmaceutical Press and the American Pharmaceutical Association: 2005; and *Handbook of Pharmaceutical Additives*, 3rd Edition; Ash and Ash Eds., Gower Publishing Company: 2007; *Pharmaceutical Preformulation and Formulation*, Gibson Ed., CRC Press LLC: Boca Raton, FL, 2004).

The term "pharmaceutical composition" refers to a mixture of a compound disclosed herein with other chemical components, such as diluents or carriers.

The term "deuterium enrichment" refers to the percentage of incorporation of deuterium at a given position in a molecule in the place of hydrogen. For example, deuterium enrichment of about 1% at a given position means that about 1% of molecules in a given sample contain deuterium at the specified position. Because the naturally occurring distribution of deuterium is about 0.0156%, deuterium enrichment at any positions in a compound synthesized using non-enriched starting materials is about 0.0156%. The deuterium enrichment can be determined using conventional analytical methods known to one of ordinary skill in the art, including mass spectrometry and nuclear magnetic resonance spectroscopy.

The term "isotopic enrichment" refers to the percentage of incorporation of a less prevalent isotope of an element at a given position in a molecule in the place of the more prevalent isotope of the element.

The term "non-isotopically enriched" refers to a molecule in which the percentages of the various isotopes are substantially the same as the naturally occurring percentages.

The term "about" or "approximately" means an acceptable error for a particular value as determined by one of ordinary skill in the art, which depends in part on how the value is measured or determined. In certain embodiments, "about" can mean with 1 or more standard deviations.

The term "active ingredient" refers to a compound, which is administered, alone or in combination with one or more pharmaceutically acceptable excipients, to a subject for treating, preventing, or ameliorating one or more symptoms of a disorder or disease.

EXAMPLES

Example 1: Synthesis of a Trapidil Derivative According to Formula I

In some embodiments, compounds disclosed herein are synthesized as shown in Scheme 1. In some embodiments, Y is a hydrogen or deuterium.

Scheme 1

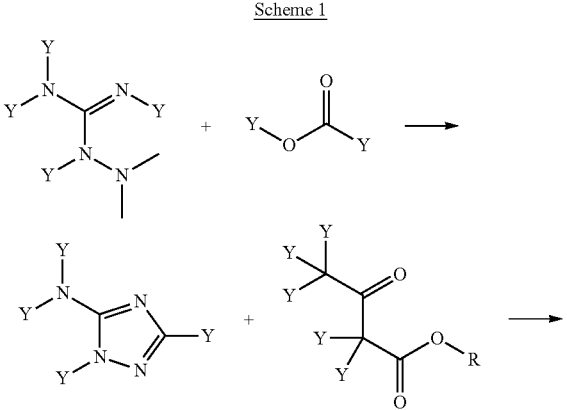

-continued

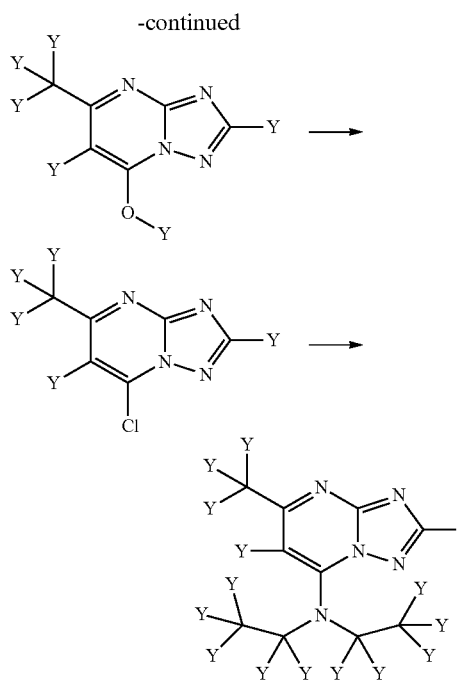

Example 2: Treating a Movement Disorder Associated with Parkinson's Disease

A subject diagnosed with a movement disorder associated with Parkinson's disease is administered a therapeutically effective amount of a Trapidil derivative according to Formula I, or a pharmaceutically salt, co-crystal or solvate thereof, and levodopa, thereby treating or preventing the movement disorder in the subject.

Example 3: Synthesis of Trapidil Derivatives from Deuterium Substituted Diethylamine Preparation 1 Synthesis of Intermediate 3a Aminoguanidine hydrochloride (30 g) was added to $D_2O$ (25 g) and the solution was stirred at 55° C. for one hour and then refluxed. Toluene (225 mL) was added and the water was removed by distillation of the azeotrope. This process was repeated 3 times and the product was lyophilized to give 31.9 g (97%) of aminoguanidine-$d_6$ deuterochloride.

A 2-L 3-neck round bottom flask equipped with a temperature probe, magnetic stirrer and $N_2$ atmosphere was charged with aminoguanidine-$d_6$ deuterochloride (26 g, 221 mmol) and formic acid-$d_2$ (16 g, 332 mmol). Toluene (1 L) was added and the reaction was heated to 45° C. for 1 h, then heated to 85 C over 30 min and stirred at 85° C. for 1 h. The flask was equipped with a Dean-Stark trap and heated at reflux overnight. After 16 h, the precipitate was collected, washed with toluene, and dried to give 26 g (94%) 1H-1,2,4-triazol-1,3-$d_2$-5-amine-$d_2$ deuterochloride.

A 2 L 3-neck round bottom flask equipped with a temperature probe, magnetic stirrer and $N_2$ atmosphere was charged with acetonitrile (2000 mL) and 1H-1,2,4-triazol-1,3-$d_2$-5-amine-$d_2$ deuterochloride. (26 g, 206 mmol) and heated to 55° C. To the suspension was added $Cs_2CO_3$ (102 g, 315 mmol) and the suspension was stirred for 4 h. The reaction mixture was filtered hot and the filtrate was evaporated to obtain 1H-1,2,4-triazol-1,3-$d_2$-5-amine-$d_2$ (18.3 g, 40%) as a light yellow solid.

A 250-mL 3-neck round bottom flask equipped with a temperature probe, magnetic stirrer and $N_2$ atmosphere was charged with 1H-1,2,4-triazol-1,3-$d_2$-5-amine-$d_2$ (7.3 g, 83 mmol), ethyl acetoacetate (11.9 g, 91 mmol) and acetic acid (58 mL), and the reaction mixture was heated at reflux for 6 h. The reaction mixture was cooled to 15° C. and ethyl ether (100 mL) was added to the stirring solution. The suspension was stirred for 15 min and the precipitate was collected and washed with ethyl ether. On standing for 1 h, a second crop of precipitate formed in the filtrate and was collected. The crops were combined and lyophilized to give 8.5 g (56 mmol, 68%) 5-(methyl-$d_3$)-[1,2,4]triazolo[1,5-a]pyrimidin-2,6-$d_2$-7-ol as a light pink solid.

Preparation 2 Synthesis of Intermediate 3b

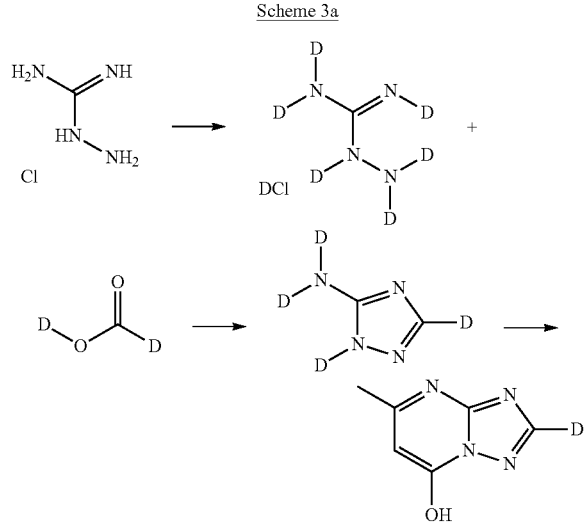

Scheme 3a

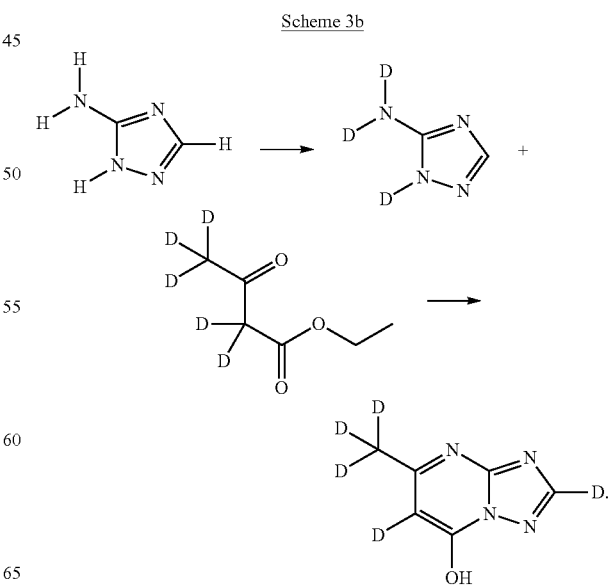

Scheme 3b

A 25 g sample of 1H-1,2,4-triazol-5-amine was treated with 50 g of methanol-$d_4$ at 45° C. for 24 h and evaporated. This process was repeated 4 times and the product was lyophilized to give 25 g (97%) 1H-1,2,4-triazol-1-d-5-amine-$d_2$.

A mixture of ethyl acetoacetate-$d_5$ (CDN Isotopes, 9.16 g, 68 mmol) and 1H-1,2,4-triazol-1-d-5-amine-$d_2$ (5 g, 68 mmol) was refluxed for 5.5 h, cooled to room temperature and stirred overnight. The precipitate was collected and washed with cold ethyl acetate (1×50 mL) to obtain 5-(methyl-$d_3$)-[1,2,4]triazolo[1,5-a]pyrimidin-2,6-$d_2$-7-ol (7.3 g, 70%) as a white solid.

The following Trapidil derivatives were synthesized using the appropriate deuterated diethylamine in accordance with Scheme 2 below, where Y represents either a hydrogen or deuterium atom.

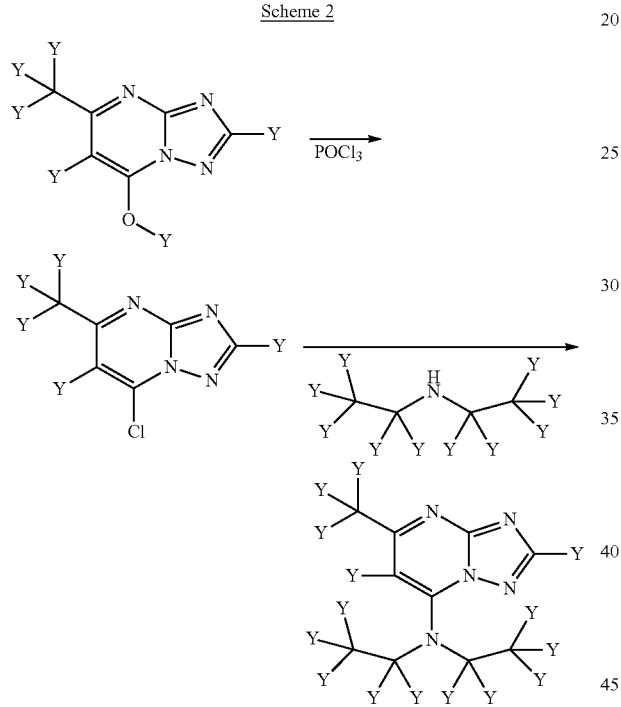

Scheme 2

A sample of 7 g of either the undeuterated 5-(methyl)-[1,2,4]triazolo[1,5-a]-pyrimidin-7-ol or intermediate 3a or intermediate 3b was suspended in 56 mL phosphorus oxytrichloride (600 mmol, 13 equiv.) and heated at reflux for 2-3 h. The mixture was evaporated and the residue was diluted with water (1 L) and neutralized with 30% ammonium hydroxide to a final pH of 7.5. The aqueous solution was extracted with chloroform (1×1000 mL, 2×500 mL). The combined organic layers were washed with brine (1×100 mL), dried over sodium sulfate and evaporated. The residue was taken up in 1:1 chloroform: ethyl acetate, loaded on 100 g of silica gel, and the product was eluted with ethyl acetate. The combined eluents were evaporated to give 4-5 g (50-70%) of the appropriate chloride intermediate as an off-white solid.

To a stirring solution of the deuterated-diethylamine (0.719 g, 1.1 equiv.) in ethanol (50 mL) at room temperature was added triethylamine (2.088 g, 2.5 equiv.) followed by the chloride-intermediate (1.4 g, 1.0 equiv.) and the reaction mixture was heated at reflux for 2 h. The reaction was evaporated and the residue was taken up in water (25 mL) and extracted with toluene (4×75 mL). The combined toluene layers were washed with brine (1×25 mL), dried over sodium sulfate and evaporated. The crude product was purified on silica gel with a 0-20% ethyl acetate gradient in dichloromethane. Typical yield: 1 g, 60%.

Examples 3-1, 3-2, and 3-3, were characterized by $^1$H and $^{13}$C NMR and GCMS, the results of which are shown in Table A below. Example 3-1 ("3-1") has 4 deuterium atoms on the diethylamino chain, Example 3-2 ("3-2") has 6 deuterium atoms, and Example 3-3 ("3-3") has 10 deuterium atoms in total (combining the 4 deuterium atoms from 3-1 and the 6 deuterium atoms from 3-2).

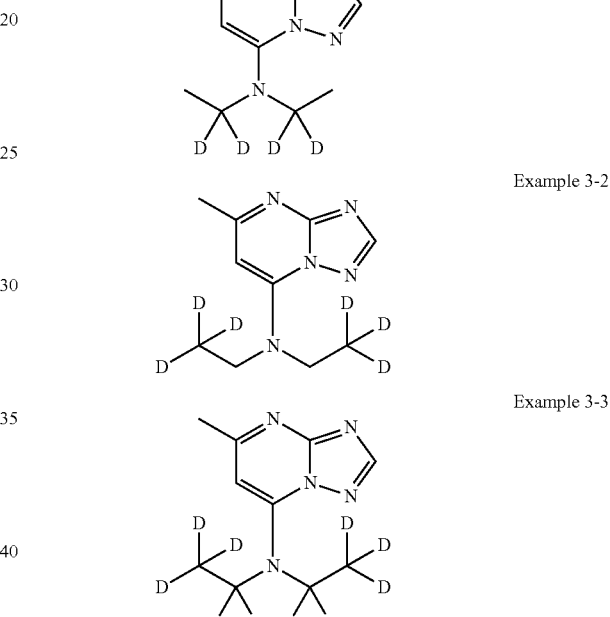

TABLE A $^1$H and $^{13}$C NMR and GCMS Characterization of Examples 3-1 to 3-3

| Example | $^1$H NMR (400 MHz, Chloroform-d) | $^{13}$C NMR (100 MHz, Chloroform-d) | GCMS |
|---|---|---|---|
| 3-1 | δ 8.23 (s, 1H), 5.95 (s, 1H), 2.53 (s, 3H), 1.33 (s, 6H) | δ 163.90, 158.01, 153.98, 148.86, 91.92, 45.13 (m), 25.20, 13.12 | m/z 209.1 |
| 3-2 | δ 8.19 (s, 1H), 5.92 (s, 1H), 3.79 (s, 4H), 2.49 (s, 3H) | δ 163.86, 157.97, 153.90, 148.88, 91.99, 45.58, 25.16, 12.51 (m) | m/z 211.2 |
| 3-3 | δ 8.17 (s, 1H), 5.89 (s, 1H), 2.47 (s, 3H) | δ 163.88, 158.00, 153.96, 148.87, 91.90, 44.96 (m), 25.18, 12.31 (m) | m/z 215.2 |

Examples 3-4 to 3-6, made from Intermediate 3a were characterized by $^1$H and $^{13}$C NMR and GCMS, the results of which are shown in Table B below.

Example 3-4

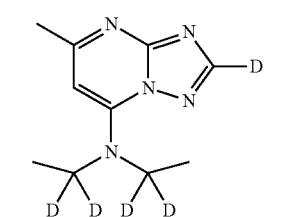

Example 3-5

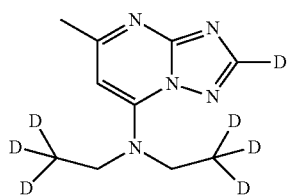

Example 3-6

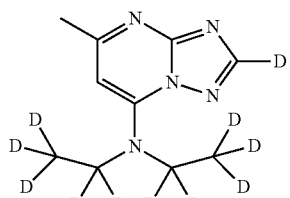

TABLE B $^1$H and $^{13}$C NMR and GCMS Characterization of Examples 3-4 to 3-6

| Example | $^1$H NMR (400 MHz, Chloroform-d) | $^{13}$C NMR (100 MHz, Chloroform-d) | GCMS |
|---|---|---|---|
| 3-4 | δ 5.94 (s, 1H), 2.52 (s, 3H), 1.33 (s, 6H) | δ 163.83, 157.95, 153.90 (m), 148.79, 91.88, 45.08 (m), 25.14, 13.10 | m/z 210.1 |
| 3-5 | δ 5.94 (s, 1H), 3.82 (s, 4H), 2.52 (s, 3H) | δ 163.84, 157.95, 153.90 (m), 148.87, 91.99, 45.58, 25.15, 12.50 (m) | m/z 212.2 |
| 3-6 | δ 5.89 (s, 1H), 2.52 (s, 3H) | δ 163.85, 157.97, 153.92(m), 148.86, 91.89, 44.96 (m), 25.16, 12.12 (m) | m/z 216.2 |

Examples 3-7 to 3-9, made from intermediate 3b, were characterized by $^1$H and $^{13}$C NMR and GCMS, the results of which are shown in Table C below.

Example 3-7

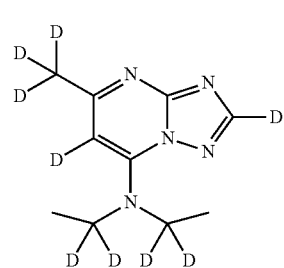

Example 3-8

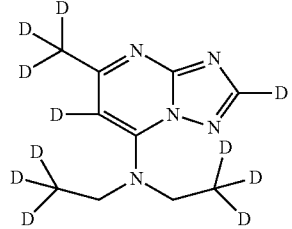

Example 3-9

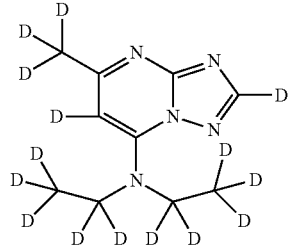

TABLE C $^1$H and $^{13}$C NMR and GCMS Characterization of Examples 3-7 to 3-9

| Example | $^1$H NMR (400 MHz, Chloroform-d) | $^{13}$C NMR (100 MHz, Chloroform-d) | GCMS |
|---|---|---|---|
| 3-7 | δ 1.27 (s, 6H) | δ 163.98, 157.90, 153.99 (m), 148.86, 91.70 (t, J = 25.3 Hz), 45.13 (m), 24.52 (m), 13.14 | m/z 214.2 |
| 3-8 | δ 3.79 (s, 4H) | δ 163.98, 157.93, 153.98(m), 148.92, 91.79 (t, J = 25.3 Hz), 45.64, 24.52 (m), 12.53 (m) | m/z 216.2 |
| 3-9 | no protons | δ 163.71, 157.86, 153.96, 148.89, 91.69 (t, J = 25.3 Hz), 45.03 (m), 24.29, 12.33 (m) | m/z 220.2 |

Example 4: Pharmacokinetic Properties of Examples 3-1 to 3-3 Compared with Trapidil Replacement of hydrogen with deuterium in drug molecules can lead to significant alterations in metabolism and provide beneficial changes in the biological effects of drugs, such as their pharmacokinetic (PK) profile. Such replacement may also have the effect of lowering toxicity by reducing the formation of a toxic metabolite. In general, it is expected that a drug molecule with more deuterium atoms will have reduced metabolism as compared to the same drug molecule with fewer deuterium atoms.

As shown herein, deuterated Trapidil derivatives exhibited superior PK profiles as compared to unmodified Trapidil. Unexpectedly, the inventors of the present disclosure discovered that certain deuterated Trapidil derivatives with fewer deuterium exhibited superior PK profiles as compared with comparable deuterated Trapidil derivatives with more deuterium.

Male Sprague Dawley rats (n=5 per group) were administered 17.5 milligrams per kilogram (mg/kg) of trapidil, 3-1, 3-2, or 3-3 orally. 17.5 mg/kg was chosen because it corresponds with a physiologically relevant dose of trapidil (Cmax of this rodent dose is equivalent to half of the human Cmax for the 200 mg capsule). Plasma samples were collected at 0.25, 0.50, 0.75, 1, 2, 4, 8, 12, and 24 hour time points. Tables 1A-1C provide the PK profiles for each of the compounds tested with oral administration.

FIG. 1 shows the results from this experiment on a linear scale. All Trapidil deuterated derivatives showed increased plasma concentrations at Cmax compared with Trapidil. The higher Cmax corresponded with higher AUCs as well, as expected. However, only 3-1 showed a significant change in half-life as compared to Trapidil. This change was also significant compared to 3-2 and 3-3. This change correspondingly significantly modified the Cmax/AUC ratio as compared to Trapidil, while 3-2 and 3-3 do not have a significantly modified change in the Cmax/AUC ratio as compared to Trapidil. This is an unexpected result, because it is expected that Trapidil derivatives with more deuterium would have longer half-lives than derivatives with fewer deuterium atoms. In particular, it would be expected that 3-3, which contains all of the deuterium atoms of 3-1, plus the deuterium atoms of 3-2, would see the greatest change in metabolism. However, instead of an additive effect of 3-1 and 3-2, an antagonistic effect was observed.

Figure 2:
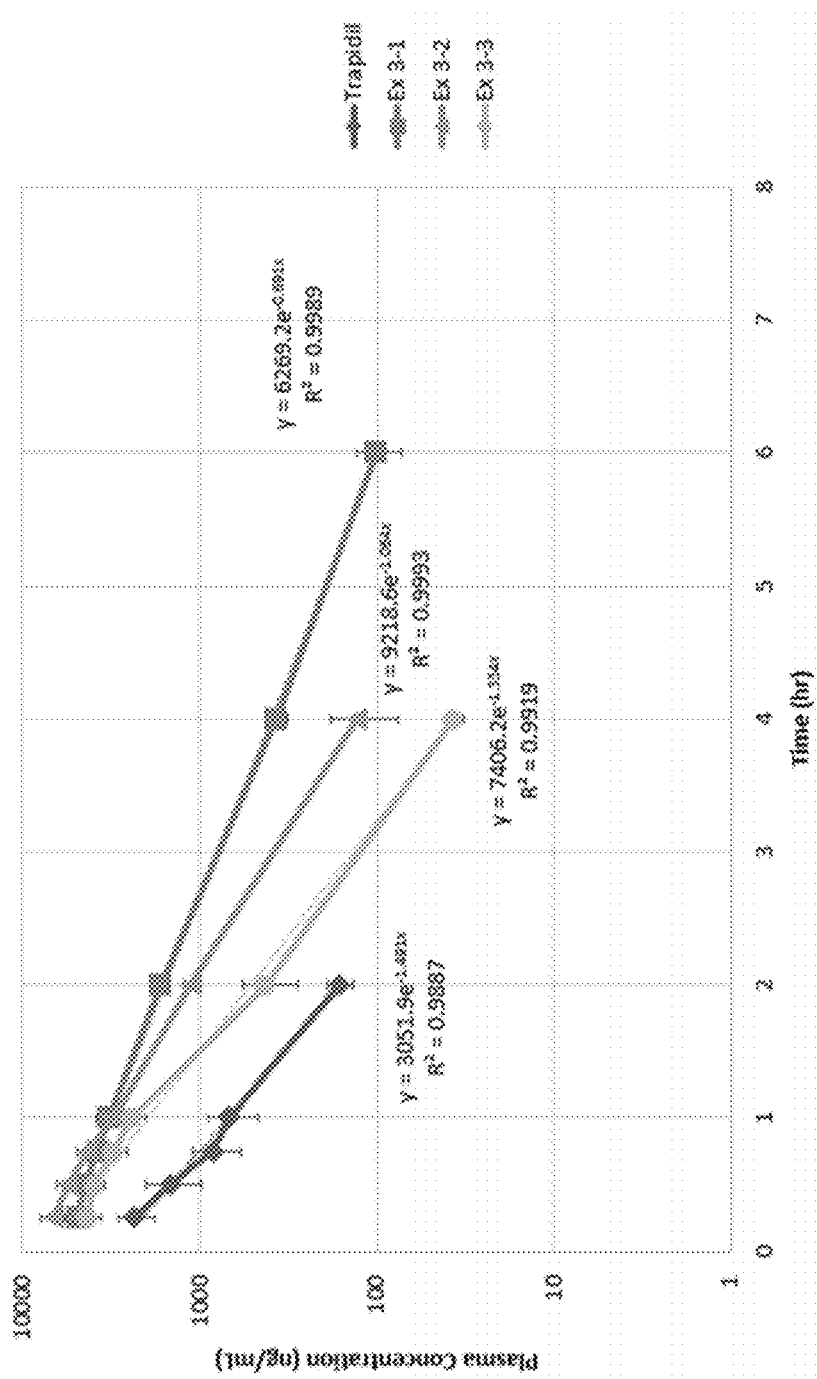
FIG. 2 shows the same results as FIG. 1 in logarithmic scale.

FIG. 2 shows the same results on a logarithmic scale. 3-1 shows a decreased slope (versus the other three compounds) indicating the 3-1 is metabolized in rats at a slower rate than 3-2, 3-3, and Trapidil when administered orally. The rank order of the rates of metabolism was unexpected.

TABLE 1B

Half-Life Kinetic Deuterium Isotope Effect for Trapidil Derivatives Administered Orally

|  | 3-1 | 3-2 | 3-3 |
|---|---|---|---|
| Half-life KDIE | 2.241 | 1.420 | 1.109 |
| 95% CI | [1.65, 2.91] | [0.997, 1.90] | [0.93, 1.33] |

TABLE 1C

Coefficient of Variation for Trapidil Derivatives Administered Orally

| Coeff Var | Trapidil | 3-1 | 3-2 | 3-3 |
|---|---|---|---|---|
| Cmax (ng/mL) | 0.526 | 0.360 | 0.317 | 0.325 |
| AUC (ng/mL*h) | 0.544 | 0.255 | 0.250 | 0.384 |

Further, as can be seen in Table 1C, the coefficient of variation of Cmax and AUC decreased with all deuterated derivatives. This reduction of variation suggests that plasma concentration profiles across animals and/or humans would demonstrate less variability among individual subjects.

A similar experiment was performed in a new cohort of Male Sprague Dawley rats, except for the compounds were administered intravenously (1 mg/kg). Tables 2A-2B provide the PK parameters for each of the compounds tested with intravenous administration.

Figure 3:
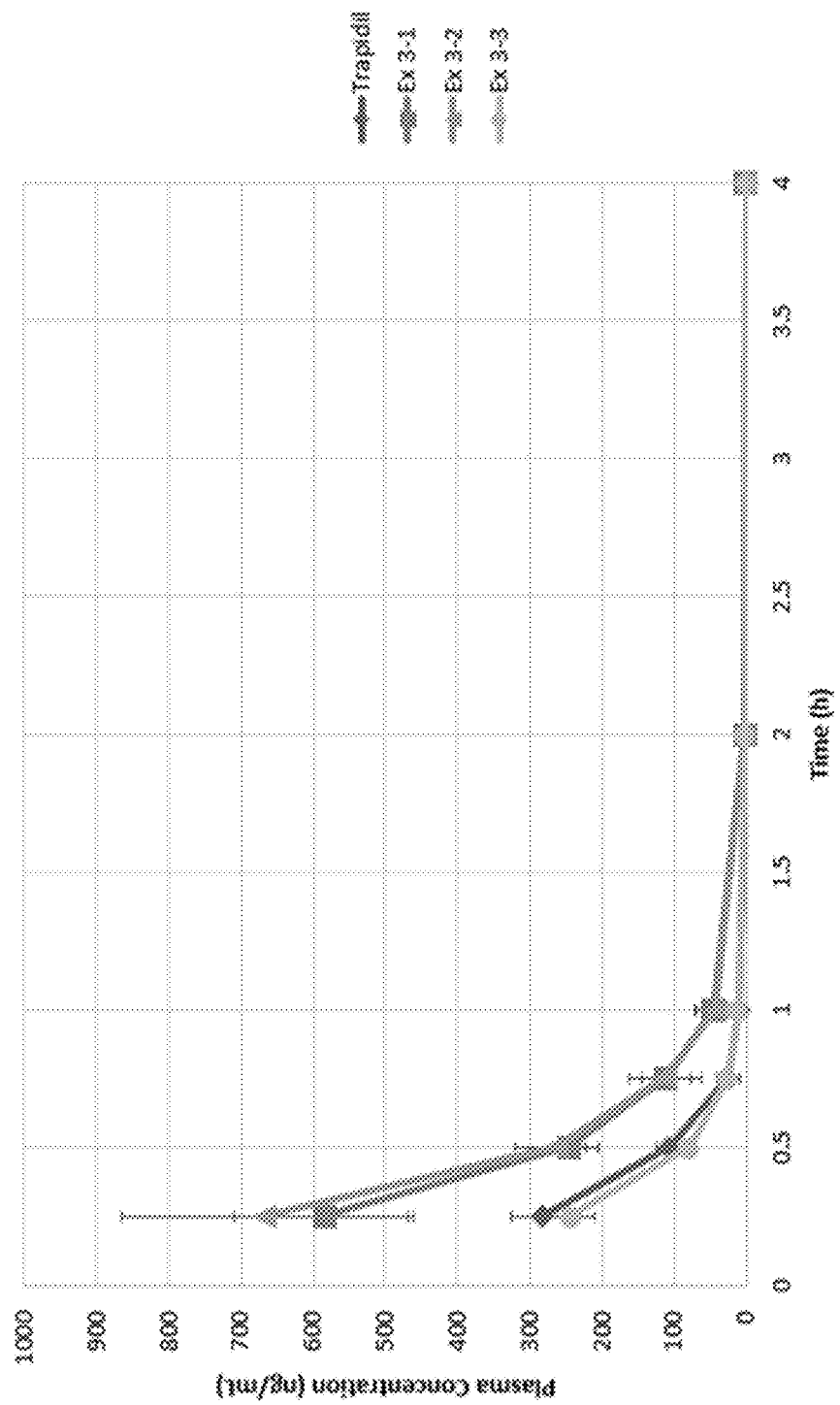
FIG. 3 shows a plasma concentration (ng/mL, linear scale) time profile of male Sprague Dawley rats following intravenous administration of Trapidil (diamond), Example 3-1 (square), 3-2 (triangle) and 3-3 (circle).
Figure 4:
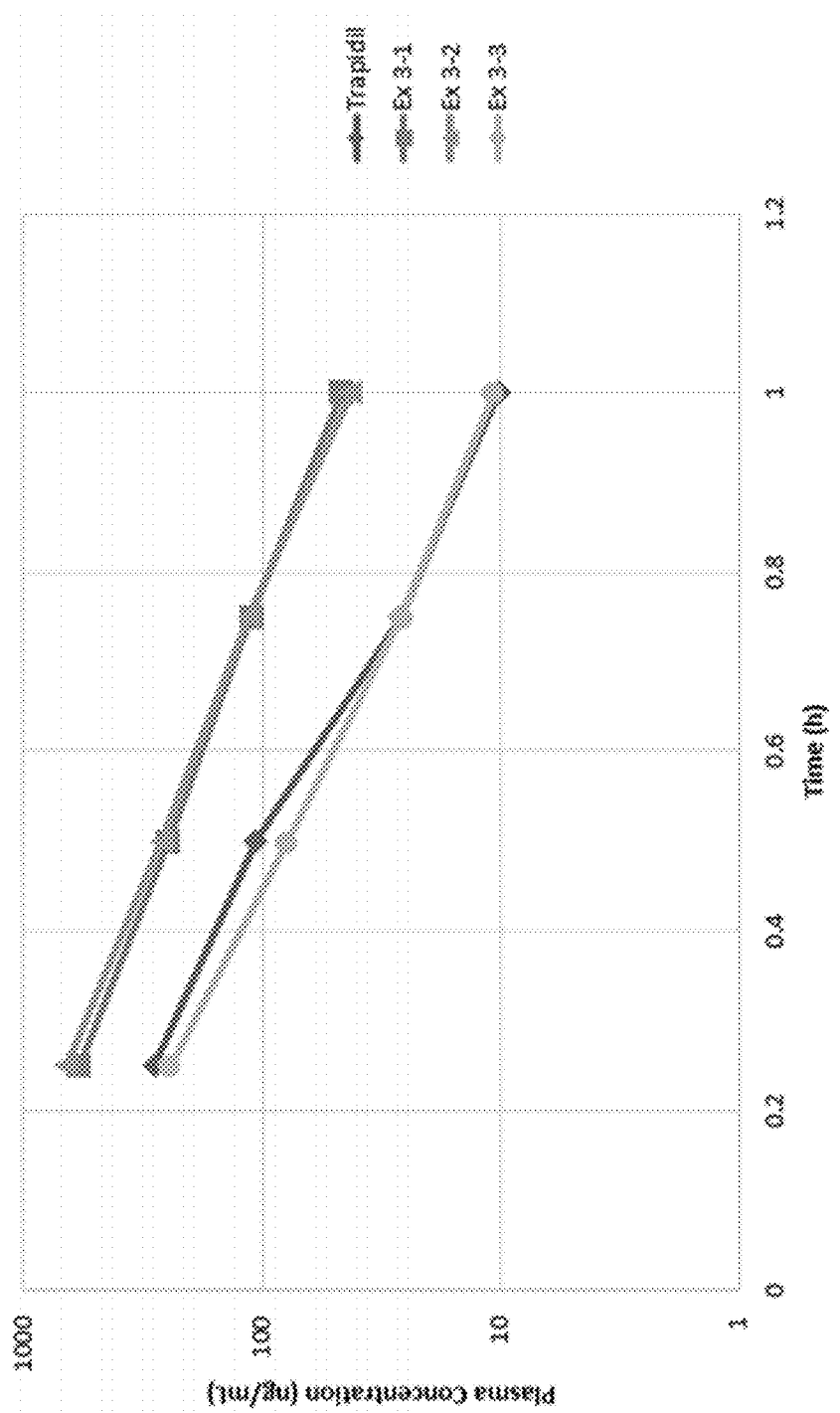
FIG. 4 shows the same results as FIG. 3 in logarithmic scale.

FIG. 3 shows the results from this experiment on a linear scale and FIG. 4 shows the same results on a logarithmic scale. As shown in Table 2B, all Trapidil derivatives exhibited longer half-lives as compared with Trapidil, with 3-1 exhibiting the longest half-life, similar to the oral administration results. Further, Cmax was increased for 3-1 and 3-2 but not 3-3. This was an unexpected result.

TABLE 1A

PK properties of Trapidil and the Trapidil Derivatives Tested for Oral Administration.

| Average value | Trapidil | 3-1 | 3-2 | 3-3 | p value (3-1 v T) | p value (3-2 v T) | p value (3-3 v T) |
|---|---|---|---|---|---|---|---|
| Cmax (ng/mL) | 2350 | 5000 | 6980 | 4490 | 0.0265 | 0.00398 | 0.0384 |
| AUC (ng/mL*h) | 2020 | 8870 | 8111 | 5107 | 3.14e-4@ | 3.64e-4@ | 0.0154 |
| Cmax/AUC | 1.23 | 0.557 | 0.894 | 0.894 | 5.38e-3*,@ | NS | NS |
| Tmax (h) | 0.25 | 0.3 | 0.3 | 0.35 | NS | NS | NS |
| T(½) (h) | 0.472 | 1.057 | 0.670 | 0.523 | 4.25e-3*,@ | NS | NS |
| CL (L/h/kg) | 5.48 | 2.36 | 1.99 | 5.35 | 0.0291@ | 0.0165 | NS |

"NS" means "not significant";

"*" means "p < 0.05 compared to 3-2";

"@" means "p < 0.05 compared to 3-3."

TABLE 2A

PK properties of Trapidil and the Trapidil Derivatives Tested for Intravenous Administration.

| Average value | Trapidil | 3-1 | 3-2 | 3-3 | p value (3-1 v T) | p value (3-2 v T) | p value (3-3 v T) |
|---|---|---|---|---|---|---|---|
| Cmax (est) | 1010 | 1420 | 1770 | 727 | 0.0135@ | 0.00558@ | 0.000827 |
| AUC | 226 | 447 | 521 | 204 | 1.78e−5@ | 1.58e−4@ | NS |
| Cmax/AUC | 4.49 | 3.19 | 3.43 | 3.57 | 0.00287 | 0.0264 | 0.00788 |
| T(½) | 0.140 | 0.204 | 0.186 | 0.177 | 0.0191 | 0.0299 | 0.0172 |
| CL (L/h/kg) | 4.49 | 2.25 | 1.97 | 4.92 | 7.52e−5@ | 5.22e−5@ | NS |

"NS" means "not significant";
"*" means "p < 0.05 compared to 3-2";
"@" means "p < 0.05 compared to 3-3."

TABLE 2B

Half-Life Kinetic Deuterium Isotope Effect for Trapidil Derivatives Administered Intravenously

|  | 3-1 | 3-2 | 3-3 |
|---|---|---|---|
| Half-life KDIE | 1.46 | 1.33 | 1.236 |
| 95% CI | [1.125, 1.831] | [1.055, 1.637] | [1.0549, 1.443] |

Bioavailability of Trapidil and the Trapidil derivatives 3-1, 3-2, and 3-3 was calculated. Bioavailability is the ratio of how much of the drug reaches systemic circulation from oral administration. It was calculated by comparing the AUC of the oral administration (PO) to the administration directly into the bloodstream (IV).

$$F = \frac{AUC_{PO} \cdot D_{IV}}{AUC_{IV} \cdot D_{PO}}$$

As the doses were different between the PO and IV administration, the AUCs are adjusted by the dose accordingly. Table 3 provides the bioavailability calculated for Trapidil, 3-1, 3-2, and 3-3.

TABLE 3

Bioavailability (F) of Trapidil and Derivatives

|  | Trapidil | 3-1 | 3-2 | 3-3 | p value (3-1 v T) | p value (3-2 v T) | p value (3-3 v T) |
|---|---|---|---|---|---|---|---|
| F | 0.511 | 1.133 | 0.889 | 1.428 | 0.0111 | 0.0658 | 0.0116 |
| F (95% CI) | [0.179, 0.871] | [0.792, 1.503] | [0.627, 1.217] | [0.763, 2.119] |  |  |  |

Table 3 shows that 3-1 and 3-3 exhibit significantly superior bioavailability and 3-2 trends toward superior bioavailability (p=0.0658). Though there was large variability, Trapidil exhibited <100% bioavailability within the 95% confidence interval while the deuterium-based derivatives all exhibited full bioavailability within the 95% confidence interval.

Example 5: Metabolic Stability of Trapidil Derivatives (3-1 to 3-9) Compared with Trapidil Metabolic stability of trapidil and deuterated derivatives were determined using rat and human liver microsomes (0.5 mg/mL protein concentration). Trapidil and compounds 3-1 to 3-9 were assayed at 1 uM with addition of 1 mM of NADPH. LC/MS/MS was used to relatively quantify percent of compound disappearance in rat microsomes (n=3 per experiment) at t=0, 15, 30, and 60 min, and in human microsomes (n=4 per experiment) at t=0, 30, 60, 90, and 120 min.

Based on percent disappearance of the several compounds, the in vitro half-life can be calculated and clearance can be estimated. Tables 4 and 5 show the half-life of compounds 3-1 to 3-9 relative to trapidil for rat and human liver microsomes respectively. Rat microsome results are similar to those seen in rodents in vivo (Example 4) with a significant increase in half-life for compound 3-1. Increased half-life in human liver microsomes (Table 5) provides evidence for translation of pharmacokinetic results in humans

TABLE 4

Relative changes in half-life of trapidil derivatives (rat liver microsomes)

| Compound | Half-Life (normalized to trapidil) | p value |
|---|---|---|
| 3-1 | 1.65 | 7.31E−04 |
| 3-2 | 1.14 | 0.253 |
| 3-3 | 1.41 | 9.81E−03 |

TABLE 4-continued

Relative changes in half-life of trapidil derivatives (rat liver microsomes)

| Compound | Half-Life (normalized to trapidil) | p value |
|---|---|---|
| 3-4 | 3.30 | 6.00E−03 |
| 3-5 | 2.32 | 0.0242 |
| 3-6 | 3.57 | 4.59E−03 |
| 3-7 | 2.89 | 9.87E−03 |
| 3-8 | 1.10 | 0.714 |
| 3-9 | 2.40 | 0.0211 |

TABLE 5

Relative changes in half-life of trapidil derivatives (human liver microsomes)

| Compound | Half-Life (normalized to trapidil) | p value |
|---|---|---|
| 3-1 | 2.03 | 0.0195 |
| 3-2 | 0.896 | 0.588 |
| 3-3 | 1.40 | 0.188 |
| 3-4 | 3.75 | 0.253 |
| 3-5 | 1.01 | 0.657 |
| 3-6 | 1.39 | 0.884 |
| 3-7 | 0.767 | 0.253 |
| 3-8 | 0.710 | 0.169 |
| 3-9 | 1.81 | 0.608 |

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed:

1. A compound or a pharmaceutically-acceptable salt or solvate thereof, wherein the compound is:

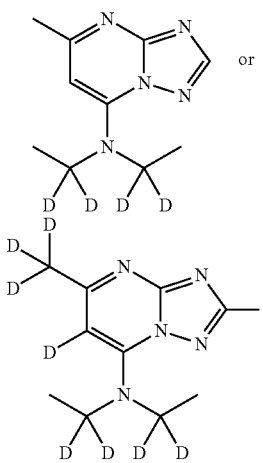

2. The compound of claim 1 or the pharmaceutically-acceptable salt or solvate thereof, wherein the compound is:

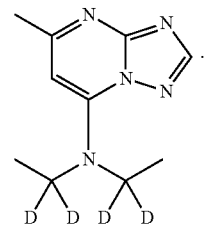 [SMILES: [2H]C([2H])(C)N(c1cc(C)nc2ncnn12)C([2H])([2H])C]

3. The compound of claim 1 or the pharmaceutically-acceptable salt or solvate thereof, wherein the compound is:

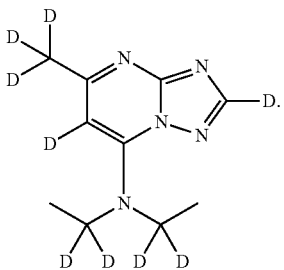

4. The compound of claim 1 or the pharmaceutically-acceptable salt or solvate thereof, wherein positions represented as D of the compound have deuterium enrichment of at least 98%.

5. The compound of claim 1 or the pharmaceutically-acceptable salt or solvate thereof, wherein positions represented as D of the compound have deuterium enrichment of at least 90%.

6. A pharmaceutical composition, comprising:
an effective amount of the compound of claim 1, or the pharmaceutically acceptable salt or solvate thereof; and
a pharmaceutically acceptable; diluent, excipient or carrier.

7. A method of treating Parkinson's disease or a movement disorder associated with Parkinson's disease in a subject in need thereof, comprising: administering to the subject the compound of claim 1 or the pharmaceutically acceptable salt or solvate thereof.

8. The method of claim 7, further comprising administering levodopa to the subject.

9. The method of claim 7, wherein the movement disorder is dyskinesia.

10. The method of claim 7, wherein the movement disorder is dystonia.

* * * * *